US009128773B2

(12) United States Patent  
Beaty et al.

(10) Patent No.: US 9,128,773 B2  
(45) Date of Patent: Sep. 8, 2015

(54) DATA PROCESSING ENVIRONMENT EVENT CORRELATION

(75) Inventors: Kirk A. Beaty, Goldens Bridge, NY (US); David Breitgand, Modiin (IL); Amir Epstein, Herzelia (IL); Daniel Marom, Kiryat Byalik (IL); Vijay K. Naik, Pleasantville, NY (US); Yih-Shin Tan, Raleigh, NC (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 13/533,517

(22) Filed: Jun. 26, 2012

(65) Prior Publication Data

US 2012/0272249 A1    Oct. 25, 2012

Related U.S. Application Data

(63) Continuation-in-part of application No. 13/400,505, filed on Feb. 20, 2012.

(60) Provisional application No. 61/446,885, filed on Feb. 25, 2011.

(51) Int. Cl.
*G06F 9/46* (2006.01)
*G06F 9/50* (2006.01)
*G06F 11/30* (2006.01)

(52) U.S. Cl.
CPC .......... *G06F 9/5083* (2013.01); *G06F 11/3006* (2013.01); *G06F 2209/508* (2013.01)

(58) Field of Classification Search
CPC .... G06F 2201/86; G06F 9/06; G06F 9/44526

USPC ......................................................... 709/221
See application file for complete search history.

(56) References Cited

U.S. PATENT DOCUMENTS

| 6,421,737 | B1 | 7/2002 | Stone et al. |
| 6,473,794 | B1 | 10/2002 | Guheen et al. |
| 7,467,198 | B2 * | 12/2008 | Goodman et al. ............ 709/223 |

(Continued)

OTHER PUBLICATIONS

"Vordel Cloud Service Broker Features," Vordel Limited, copyright 1999-2011, 1 pages, accessed May 21, 2013,http://web.archive.org/web/20110926081542/http://www.vordel.com/products/cloud_service_broker/features.html.

(Continued)

*Primary Examiner* — Kevin Bates
*Assistant Examiner* — Nazia Naoreen
(74) *Attorney, Agent, or Firm* — Yee & Associates, P.C.; Louis J. Percello

(57) ABSTRACT

A system and method for correlating events in data processing resources processing a workload. An event correlation service comprising an event correlation service software framework is provided on a processor unit. The event correlation service is configured, using the event correlation service software framework, for correlating the events from monitored data for the workload, wherein the workload is processed using the data processing resources provided by a provider of the data processing resources. The event correlation service receives monitored data for the workload as the workload is being processed. The monitored data is processed by the event correlation service to identify an occurrence of an event of interest for the workload as the workload is being processed. An output is provided in response to identifying the occurrence of the event of interest.

23 Claims, 15 Drawing Sheets

(56) References Cited

U.S. PATENT DOCUMENTS

| | | | |
|---|---|---|---|
| 7,644,161 | B1 | 1/2010 | Graupner et al. |
| 7,953,425 | B2 | 5/2011 | Jordan |
| 7,996,455 | B2 | 8/2011 | Jackson |
| 8,745,361 | B2 | 6/2014 | Shah et al. |
| 8,988,998 | B2 | 3/2015 | Adam et al. |
| 9,009,697 | B2 | 4/2015 | Breiter et al. |
| 9,053,580 | B2 | 6/2015 | Adam et al. |
| 9,063,789 | B2 | 6/2015 | Beaty et al. |
| 2003/0009547 | A1 | 1/2003 | Benfield et al. |
| 2004/0240408 | A1 | 12/2004 | Gur |
| 2005/0254421 | A1 | 11/2005 | Galou et al. |
| 2006/0215650 | A1 | 9/2006 | Wollmershauser et al. |
| 2007/0134069 | A1 | 6/2007 | Smith et al. |
| 2008/0022384 | A1 | 1/2008 | Yee et al. |
| 2008/0244579 | A1 | 10/2008 | Muller |
| 2009/0063869 | A1 | 3/2009 | Kohavi et al. |
| 2009/0113392 | A1 | 4/2009 | Wijenayake et al. |
| 2009/0199193 | A1 | 8/2009 | Jackson |
| 2009/0271472 | A1 | 10/2009 | Scheifler et al. |
| 2009/0307705 | A1 | 12/2009 | Bogner |
| 2009/0328221 | A1 | 12/2009 | Blumfield et al. |
| 2010/0023949 | A1 | 1/2010 | Jackson |
| 2010/0042670 | A1 | 2/2010 | Kamalakantha et al. |
| 2010/0042720 | A1 | 2/2010 | Stienhans et al. |
| 2010/0192170 | A1 | 7/2010 | Raleigh |
| 2010/0199267 | A1 | 8/2010 | Rolia et al. |
| 2010/0250746 | A1 | 9/2010 | Murase |
| 2010/0292857 | A1 | 11/2010 | Bose et al. |
| 2011/0004654 | A1 | 1/2011 | Tasa et al. |
| 2011/0016214 | A1* | 1/2011 | Jackson ............. 709/226 |
| 2011/0126047 | A1 | 5/2011 | Anderson et al. |
| 2011/0131316 | A1* | 6/2011 | Ferris et al. ........... 709/224 |
| 2011/0131504 | A1 | 6/2011 | Shustef |
| 2011/0145413 | A1* | 6/2011 | Dawson et al. ........ 709/226 |
| 2011/0231899 | A1 | 9/2011 | Pulier et al. |
| 2011/0289329 | A1 | 11/2011 | Bose et al. |
| 2012/0023221 | A1* | 1/2012 | Dayan ................ 709/224 |
| 2012/0030341 | A1 | 2/2012 | Jensen et al. |
| 2012/0036249 | A1 | 2/2012 | Chandrasekaran |
| 2012/0054763 | A1 | 3/2012 | Srinivasan |
| 2012/0096320 | A1 | 4/2012 | Caffrey |
| 2012/0110044 | A1 | 5/2012 | Nagpal et al. |
| 2012/0159337 | A1 | 6/2012 | Travilla et al. |
| 2012/0166992 | A1 | 6/2012 | Huynh et al. |
| 2012/0185913 | A1* | 7/2012 | Martinez et al. ............ 726/1 |
| 2012/0203908 | A1 | 8/2012 | Beaty et al. |
| 2012/0204169 | A1 | 8/2012 | Breiter et al. |
| 2012/0204187 | A1 | 8/2012 | Breiter et al. |
| 2012/0221690 | A1 | 8/2012 | Beaty et al. |
| 2012/0222084 | A1 | 8/2012 | Beaty et al. |
| 2012/0239722 | A1* | 9/2012 | Bolosky et al. ......... 709/201 |
| 2013/0069950 | A1 | 3/2013 | Adam et al. |
| 2013/0080642 | A1 | 3/2013 | Adam et al. |
| 2013/0185413 | A1 | 7/2013 | Beaty et al. |

OTHER PUBLICATIONS

"On-Demand Identity Management for All Your Web Applications," Okta Cloud Services Platform, Okta, Inc., copyright 2011, 2 pages, accessed May 21, 2013http://web.archive.org/web/20110206225912/http://www.okta.com/products/.

"WebSphere Cast Iron Cloud Integration," IBM CastIron Solution, IBM, May 2011, 2 pages, accesed May 21, 2013http://web.archive.org/web/20110504214512/http://www-01.ibm.com/software/integration/cast-iron-cloud-integration/.

Mell et al., "The NIST Definition of Cloud Computing," National Institute of Standards and Technology, Information Technology LabOratory, Version 15, Oct. 2009, 2 pages.

Final Office Action, dated Jun. 14, 2013, regarding U.S. Appl. No. 13/023,103, 35 pages, Final Office Action dated Sep. 9, 2013, regarding U.S. Appl. No. 13/023,159, 27 pages.

Notice of Allowance dated Nov. 25, 2013, regarding U.S. Appl. No. 13/023,159, 16 pages.

Breiter et al., "Hybrid Cloud Workload Management," U.S. Appl. No. 13/023,159, filed Feb. 8, 2011, 67 pages.

Beaty et al., "Hybrid Cloud Integrator Plug-In Components," U.S. Appl. No. 13/023,103, filed Feb. 8, 2011, 67 pages.

Breiter et al., "Hybrid Cloud Workload Management," U.S. Appl. No. 13/023,159, filed Feb. 8, 2011, 86 pages.

Beaty et al., "Integrated Metering of Service Usage for Hybrid Clouds," U.S. Appl. No. 13/350,752, filed Jan. 14, 2012, 67 pages.

Adam et al., "Data Processing Environment Integration Control," U.S. Appl. No. 13/680,385, filed Nov. 19, 2012, 104 pages.

Adam et al., "Data Processing Environment Integration Control Interface," U.S. Appl. No. 13/680,458, filed Nov. 19, 2012, 104 pages.

Beaty et al., "Virtual Security Zones for Data Processing Environments," U.S. Appl. No. 13/358,186, filed Jan. 25, 2012, 100 pages.

Beaty et al., "Data Processing Environment Monitoring," U.S. Appl. No. 13/400,505, filed Feb. 20, 2012, 100 pages.

Cloud Computing, National Institute of Standards and Technology, http://csrc.nist.gov/groups/SNS/cloud-computing/index.html, created May 11, 2009, accessed May 11, 2011, 1 page.

Mell et al., "The NIST Definition of Cloud Computing (Draft), Recommendations of the National Institute of Standards and Technology," Jan. 2011, 7 pages.

Non-final office action dated Jan. 3, 2013 regarding U.S. Appl. No. 13/023,103, 27 pages.

Non-final office action dated Mar. 7, 2013 regarding U.S. Appl. No. 13/023,159, 27 pages.

Office action dated Feb. 28, 2014 regarding U.S. Appl. No. 13/023,103, 36 pages.

Office action dated Mar. 21, 2014, regarding U.S. Appl. No. 13/400,505, 72 pages.

Notice of allowance dated Dec. 5, 2014, regarding U.S. Appl. No. 13/023,051, 19 pages.

Final office action dated Dec. 23, 2014, regarding U.S. Appl. No. 13/358,186, 20 pages.

Notice of allowance dated Nov. 7, 2014, regarding U.S. Appl. No. 13/680,385, 14 pages.

Office action dated Dec. 3, 2014, regarding U.S. Appl. No. 13/680,485, 52 pages.

Notice of allowance dated Feb. 2, 2015, regarding U.S. Appl. No. 13/023,103, 20 pages.

Notice of allowance dated Mar. 27, 2015, regarding U.S. Appl. No. 13/358,186, 14 pages.

Notice of allowance dated Feb. 2, 2015, regarding U.S. Appl. No. 13/680,485, 9 pages.

Office action dated Jun. 19, 2014, regarding U.S. Appl. No. 13/023,051, 57 pages.

Office action dated Sep. 12, 2014, regarding U.S. Appl. No. 13/680,385, 43 pages.

Office action dated Aug. 14, 2014, regarding U.S. Appl. No. 13/358,186, 34 pages.

\* cited by examiner

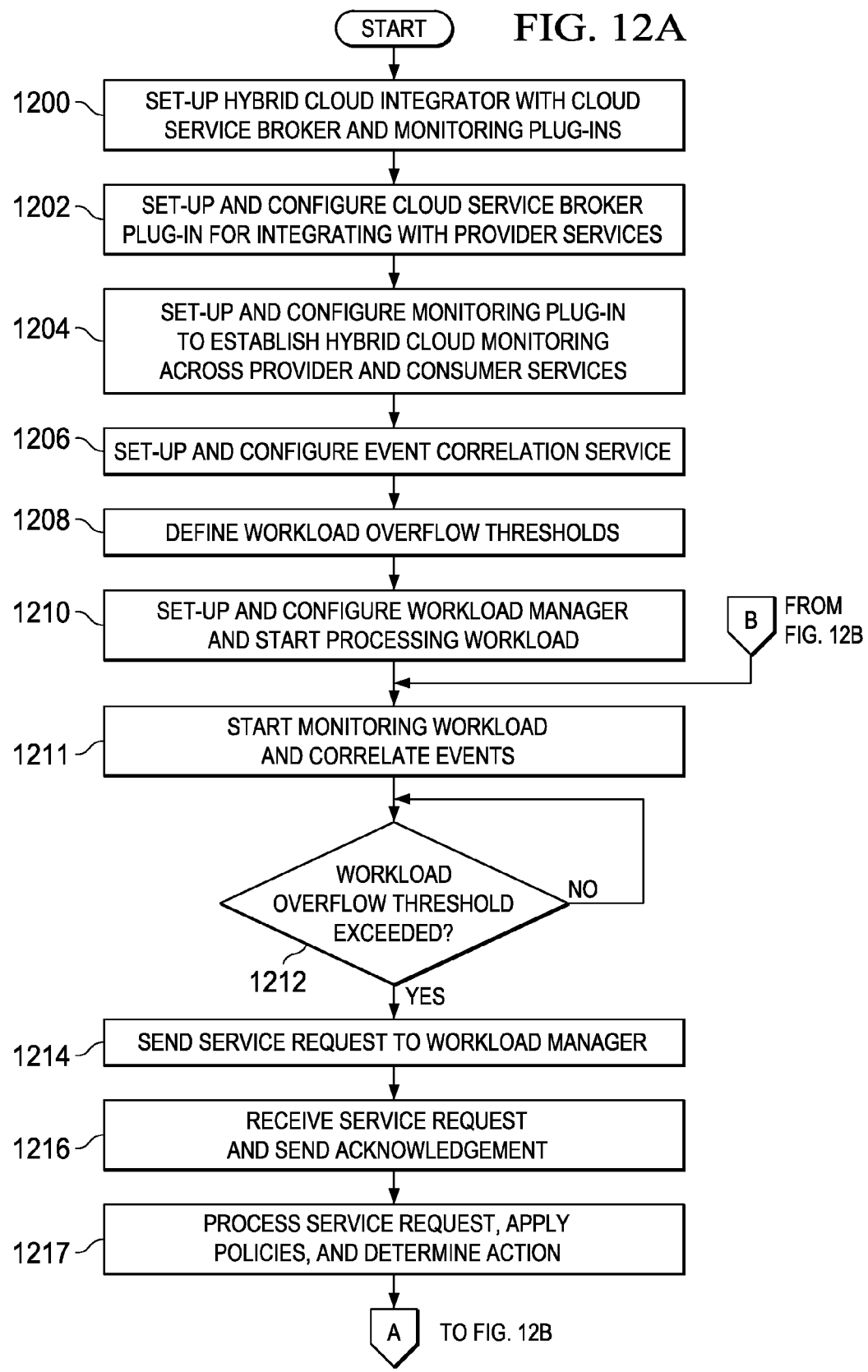

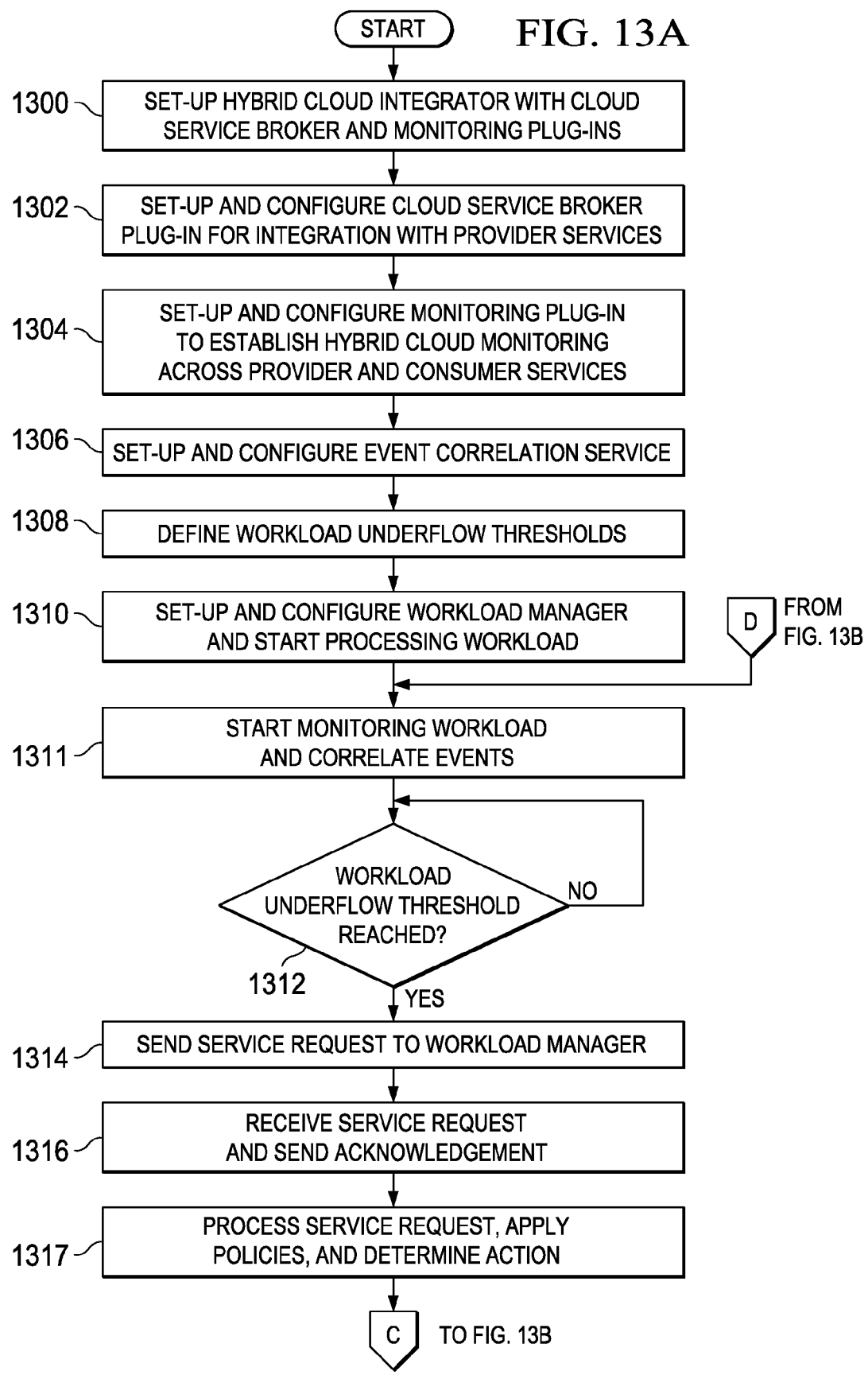

DATA PROCESSING ENVIRONMENT EVENT CORRELATION

This application is a continuation-in-part of U.S. patent application Ser. No. 13/400,505, filed Feb. 20, 2012, which claims the benefit of U.S. Provisional Patent Application No. 61/446,885, filed Feb. 25, 2011, both of which are incorporated by reference herein in entirety.

BACKGROUND

1. Field

The disclosure relates generally to data processing systems and methods and more specifically to systems and methods for using data processing resources provided as a service, known as cloud computing, and to systems and methods for processing a workload using such data processing resources and for correlating monitored data from such data processing resources to identify the occurrence of an event of interest.

2. Description of the Related Art

Cloud computing is a model of service delivery for enabling convenient, on-demand network access to a shared pool of configurable computing resources that can be rapidly provisioned and released with minimal management effort or interaction with a provider of the service. For example, cloud computing allows a consumer to obtain data processing resources, such as networks, network bandwidth, servers, processing, memory, storage, applications, virtual machines, and services as a service on a temporary basis when needed. Several vendors are currently offering various cloud services. For example, such services include infrastructure as a service, platform as a service, storage as a service, software as a service, and business process as a service cloud services. These services use vendor-specific service requests, access, and consumption models.

A consumer of cloud computing services may have its own data processing system resources. For example, the consumer may be a business or other entity. The consumer may have invested in its own data processing system resources. These resources may include a computer network. The consumer's computer network provides a limited amount of processing capability and data storage resources. The consumer's computer network also provides specific data processing applications. The consumer's computer network may be located on-premise and may be operated as a private cloud.

At certain times, the consumer may require data processing resources beyond those available in its computer network. For example, at certain times, the demand for data processing resources may outstrip the capability of the consumer's computer network. At these times, the response time of the consumer's computer network for some applications may increase to unacceptable levels. At other times, the consumer may require data processing applications that are not available on the consumer's own computer network. For example, the consumer may require, at times, the use of data processing applications that are not part of the consumer's core competency.

At those times when the consumer requires data processing resources beyond its own, the consumer may purchase such resources as a service on a temporary basis from a provider of cloud computing services. For example, the consumer may obtain additional processing or storage resources or specific application functionality as a service on a temporary basis from the cloud computing provider's data processing resources. Different types of service offerings may provide parts of the solution used in processing the consumer's workload. The provider's available data processing resources is known as a public cloud.

The consumer typically continues to operate its own computer network while some data processing resources are being obtained from a public cloud. Thus, data processing resources from the public cloud typically are obtained in order to supplement the data processing resources of the consumer's own private cloud at certain times of need. The simultaneous and coordinated operation of data processing resources from multiple clouds may be referred to as hybrid cloud computing. For example, operation of the consumer's private cloud along with resources obtained from one or more public clouds is a specific example of hybrid cloud computing.

SUMMARY

According to one illustrative embodiment, a method for correlating events in data processing resources processing a workload is provided. An event correlation service comprising an event correlation service software framework is provided on a processor unit. The event correlation service is configured, using the event correlation service software framework, for correlating the events from monitored data for the workload, wherein the workload is processed using the data processing resources provided by a provider of the data processing resources. Monitored data for the workload is received by the event correlation service as the workload is being processed. The monitored data is processed by the event correlation service to identify an occurrence of an event of interest for the workload as the workload is being processed. An output is provided in response to identifying the occurrence of the event of interest.

According to another illustrative embodiment, a computer program product for correlating events in data processing resources processing a workload is provided. The computer program product comprises a computer readable storage medium and program instructions stored on the computer readable storage medium. The program instructions comprises first program instructions to provide an event correlation service comprising an event correlation service software framework, second program instructions to configure the event correlation service, using the event correlation service software framework, for correlating events from monitored data for the workload, wherein the workload is processed using data processing resources provided by a provider of the data processing resources, third program instructions to receive, by the event correlation service, the monitored data for the workload as the workload is being processed, fourth program instructions to process the monitored data, by the event correlation service, to identify an occurrence of an event of interest for the workload as the workload is being processed, and fifth program instructions to provide an output in response to identifying the occurrence of the event of interest.

According to another illustrative embodiment, an apparatus is provided comprising a software framework, a software plug-in loaded on the software framework, an instance of the software plug-in loaded on the software framework, and a processor unit. The software plug-in comprises first correlation parameters used for correlating events in data processing resources. The instance comprises the first correlation parameters inherited from the software plug-in and second correlation parameters comprising workload specific parameters used for correlating the events in processing a workload. The processor unit is configured to receive monitored data for the workload as the workload is being processed by the data processing resources, process the monitored data using the instance to identify an occurrence of an event of interest from the monitored data using the first correlation parameters and the second correlation parameters, and provide an output responsive to identifying the occurrence of the event of interest.

According to another illustrative embodiment, another method for correlating events in data processing resources processing a workload is provided. A request to correlate events in the data processing resources processing the workload is received by the processor unit. Responsive to receiving the request, it is determined by the processor unit whether a software plug-in is loaded on a framework. The software plug-in comprises first correlation parameters used for correlating the events in processing the workload. Responsive to a determination that the software plug-in is not loaded on the framework, an application programming interface of the framework is used to load the software plug-in on the framework. An instance of the software plug-in loaded on the framework then is created. The instance comprises the first correlation parameters inherited from the software plug-in and second correlation parameters comprising workload specific parameters used for correlating the events in processing the workload. Monitored data for the workload may be received, using the framework, as the workload is being processed. The monitored data may be processed using the instance to identify an occurrence of an event of interest from the monitored data using the first correlation parameters and the second correlation parameters. An output may be provided responsive to identifying the occurrence of the event of interest.

Further objects, features, and advantages will be apparent from the following detailed description, and taking into consideration the attached drawing figures.

BRIEF DESCRIPTION OF THE SEVERAL VIEWS OF THE DRAWINGS

FIGS. 12A-12B are flowcharts of a process for workload overflow management in accordance with an illustrative embodiment; and FIGS. 13A-13B are flowcharts of a process for workload underflow management in accordance with an illustrative embodiment.

DETAILED DESCRIPTION

Figure 1:
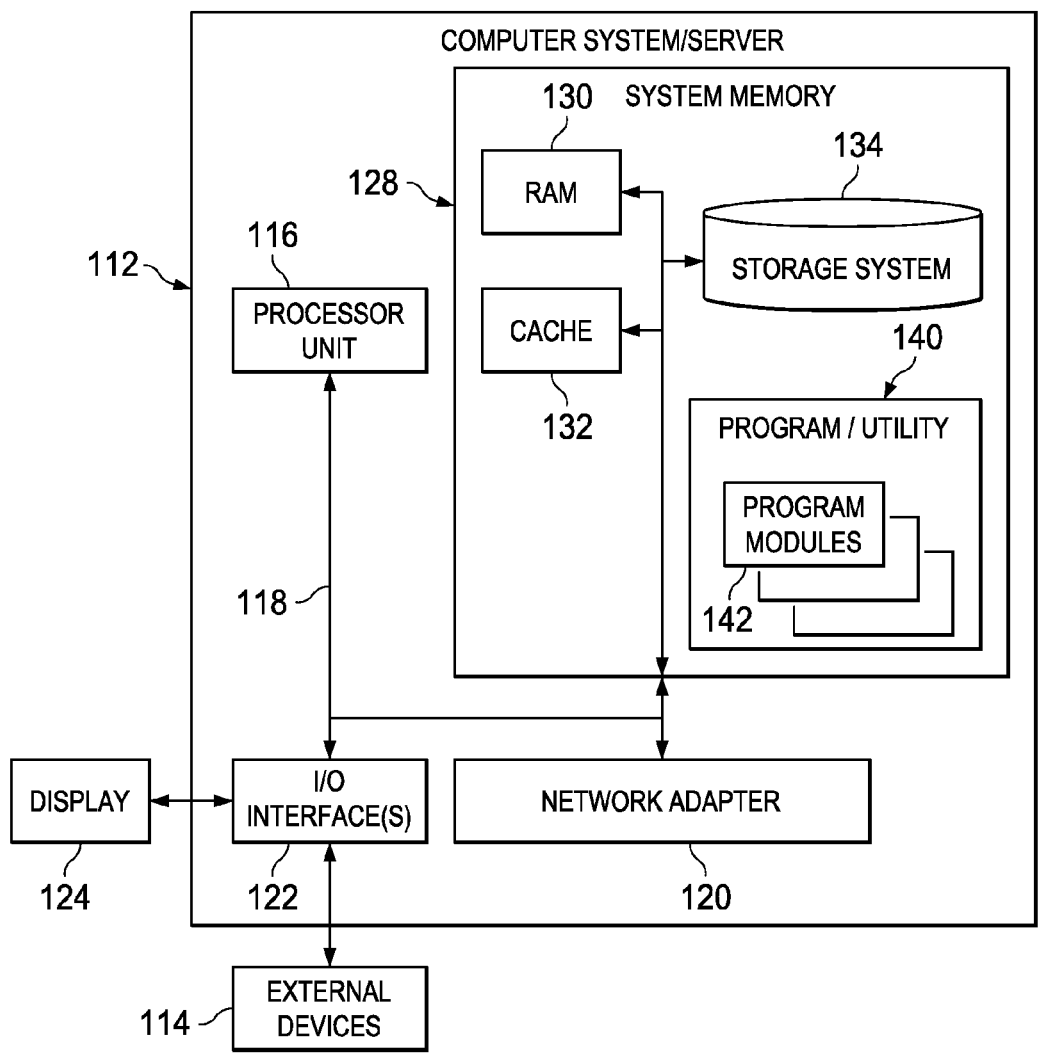
FIG. 1 is a schematic of an example of a cloud computing node in accordance with an illustrative embodiment.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the detailed description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out, and rapidly released, to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or consumer-acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds) and service interoperability.

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is depicted in accordance with an illustrative embodiment. Cloud computing node 110 is only one example of a suitable cloud computing node and is not intended to suggest any limitation as to the scope of use or functionality of the illustrative embodiments described herein. Regardless, cloud computing node 110 is capable of being implemented and/or performing any of the functionality set forth hereinabove.

Cloud computing node 110 comprises computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system/server 112 may be described in the general context of computer system executable instructions, such as program modules being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processor unit 116, system memory 128, and bus 118 that couples various system components including system memory 128 to processor unit 116.

Processor unit 116 executes instructions for software that may be loaded into system memory 128. Processor unit 116 may be a number of processors, a multi-processor core, or some other type of processor, depending on the particular implementation. A number, as used herein with reference to an item, means one or more items. Further, processor unit 116 may be implemented using a number of heterogeneous processor systems in which a main processor is present with secondary processors on a single chip. As another illustrative example, processor unit 116 may be a symmetric multi-processor system containing multiple processors of the same type.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112 and it includes both volatile media, non-volatile media, removable media, and non-removable media.

System memory 128 can include computer system readable media in the form of volatile memory, such as random access memory (RAM) 130 and/or cache memory 132. Computer system/server 112 may further include other removable/non-removable and volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM, or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the illustrative embodiments.

Program/utility 140, having a set (at least one) of program modules 142, may be stored in memory 128 by way of example and not limitation, as well as an operating system, one or more application programs, other program modules, and program data. Each of the operating systems, one or more application programs, other program modules, and program data or some combination thereof may include an implementation of a networking environment. Program modules 142 generally carry out the functions and/or methodologies of the illustrative embodiments as described herein.

Computer system/server 112 may also communicate with one or more external devices 114, such as a keyboard, a pointing device, display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks, such as a local area network (LAN), a general wide area network (WAN), and/or a public network (e.g., the Internet) via network adapter 120. As depicted, network adapter 120 communicates with the other components of computer system/server 112 via bus 118. It should be understood that, although not shown, other hardware and/or software components could be used in conjunction with computer system/server 112. Examples include, but are not limited to, microcode, device drivers, redundant processing units, external disk drive arrays, RAID systems, tape drives, and data archival storage systems, etc.

Figure 2:
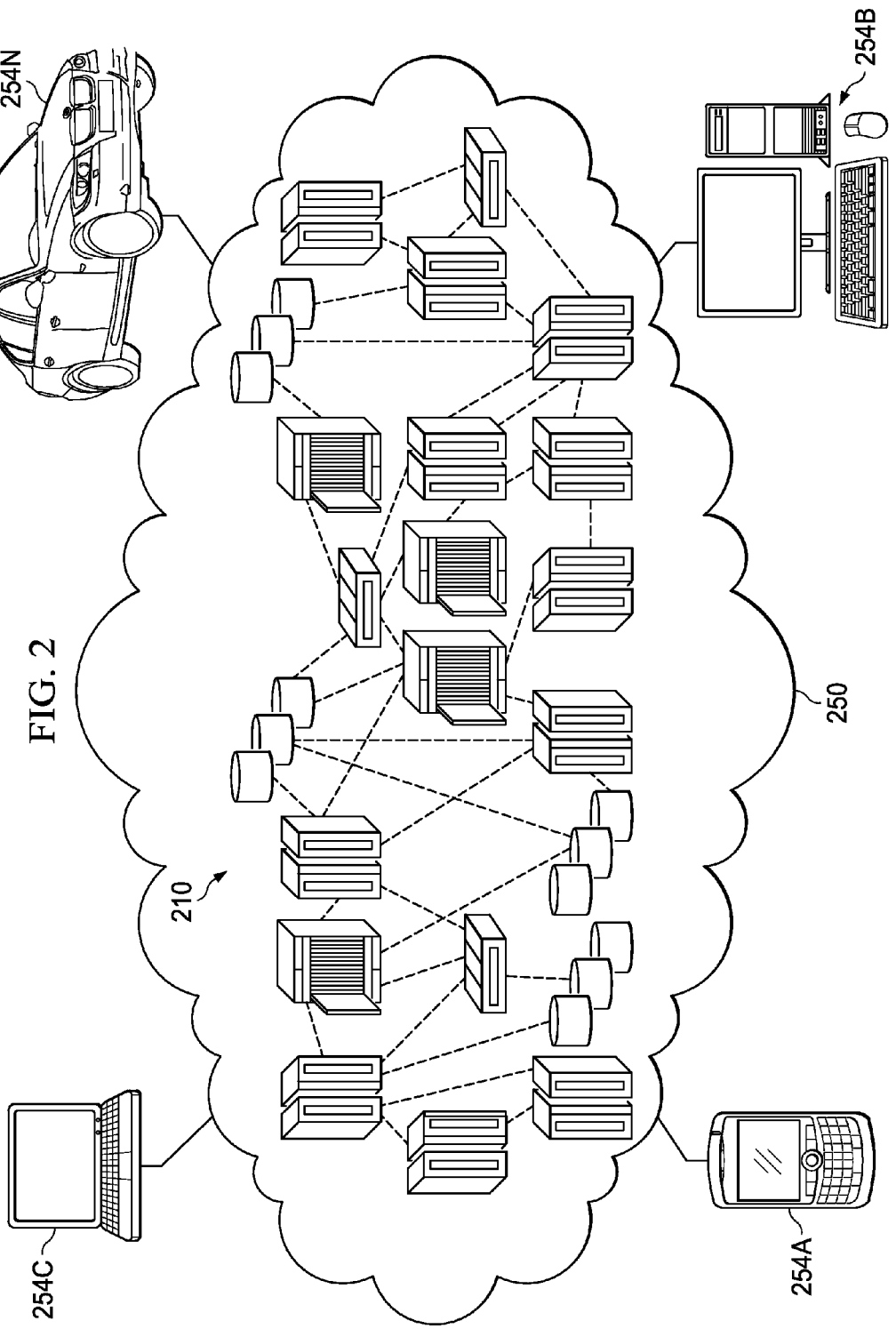
FIG. 2 is an illustration of a cloud computing environment in accordance with an illustrative embodiment.

Referring now to FIG. 2, an illustration of a cloud computing environment is depicted in accordance with an illustrative embodiment. In this illustrative example, cloud computing environment 250 comprises one or more cloud computing nodes 210 with which local computing devices used by cloud consumers may communicate. For example, cloud computing node 110 in FIG. 1 is one example of cloud computing nodes 210. Local computing devices which may communicate with cloud computing nodes 210 may include, for example, personal digital assistant (PDA) or cellular telephone 254A, desktop computer 254B, laptop computer 254C, and/or automobile computer system 254N. Cloud computing nodes 210 may communicate with one another. They may be grouped (not shown) physically or virtually, in one or more networks, such as private, community, public, or hybrid clouds as described hereinabove or a combination thereof. This allows cloud computing environment 250 to offer infrastructure, platforms, and/or software as services for which a cloud consumer does not need to maintain resources on a local computing device. It is understood that the types of computing devices 254A, 254B, 254C, and 254N shown in FIG. 2 are intended to be illustrative only and that cloud computing nodes 210 and cloud computing environment 250 can communicate with any type of computerized device over any type of network and/or network addressable connection (e.g., using a web browser). Program code located on one of cloud computing nodes 210 may be stored on a computer recordable storage medium in one of cloud computing nodes 210 and downloaded to a computing device within computing devices 254A, 254B, 254C, and 254N over a network for use in these computing devices. For example, a server computer in cloud computing nodes 210 may store program code on a computer readable storage medium on the server computer. The server computer may download the program code to a client computer in computing devices 254A, 254B, 254C, and 254N for use on the client computer.

Figure 3:
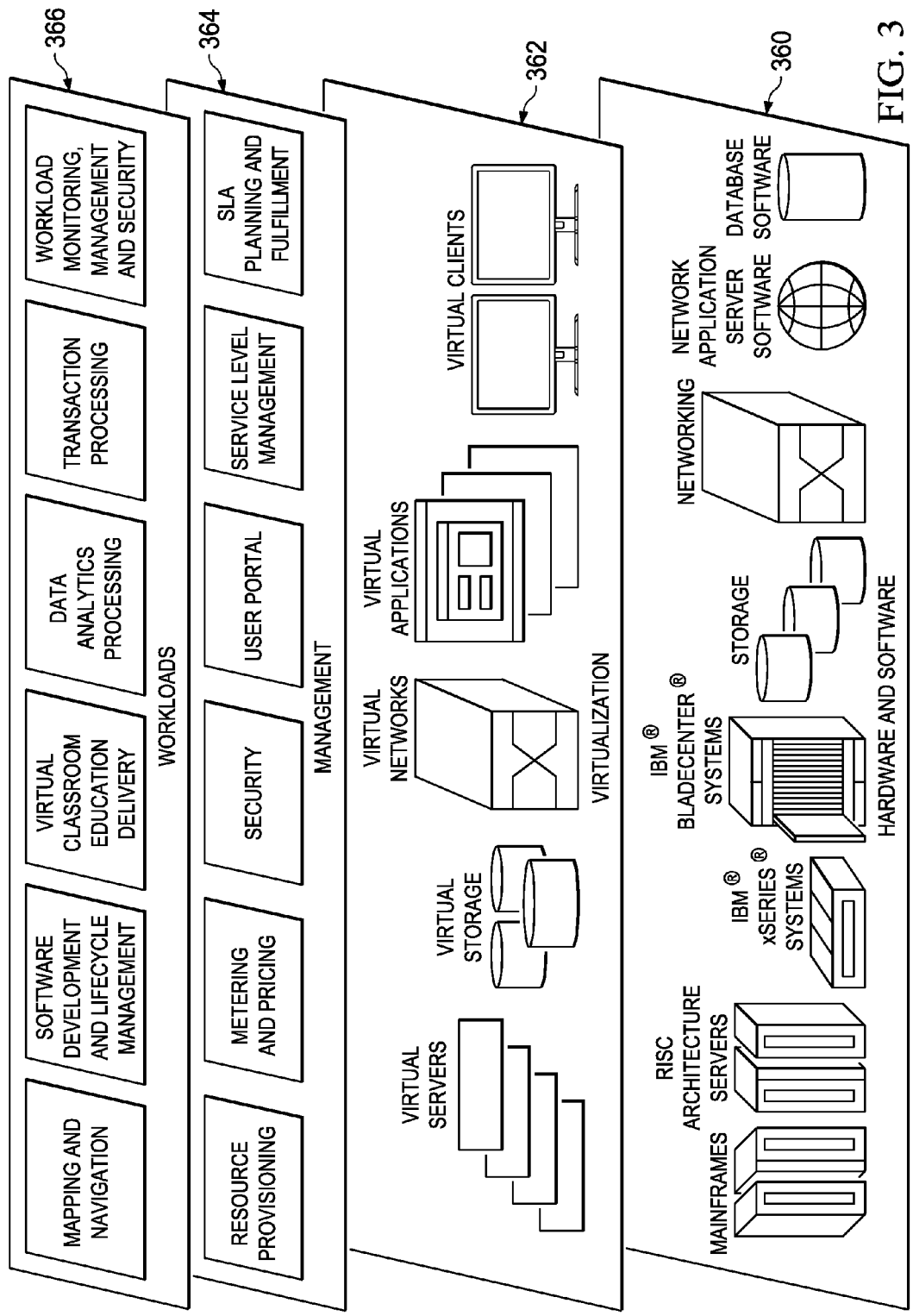
FIG. 3 is a set of functional abstraction layers in accordance with an illustrative embodiment.

Referring now to FIG. 3, a set of functional abstraction layers is depicted in accordance with an illustrative embodiment. The set of functional abstraction layers may be provided by cloud computing environment 250 in FIG. 2. It should be understood in advance that the components, layers, and functions shown in FIG. 3 are intended to be illustrative only and illustrative embodiments are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; and networks and networking components. Examples of software components include network application server software, in one example IBM® WebSphere® application server software; and database software, in one example IBM® DB2® database software. (IBM®, zSeries®, pSeries®, xSeries®, BladeCenter®, WebSphere®, and DB2® are trademarks of International Business Machines Corporation registered in many jurisdictions worldwide.)

Virtualization layer 362 provides an abstraction layer from which the following examples of virtual entities may be provided: virtual servers; virtual storage; virtual networks including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and pricing provide usage and cost tracking as resources are utilized within the cloud computing environment and billing or invoicing for consumption of these resources. In one example, these resources may comprise application software licenses. Security provides identity verification for cloud consumers and tasks as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload monitoring, management, and security processing.

The different illustrative embodiments recognize and take into account a number of different considerations. For example, the different illustrative embodiments recognize and take into account that many enterprises have an existing investment in information technology resources. These enterprises want to use their existing infrastructure, software, and management resources. At times, such enterprises also may want to augment their own data processing resources selectively with cloud based services. Thus, for economic and functional reasons, there may be a need to use on-premise enterprise infrastructure, platform, applications, or data, and off-premise cloud service infrastructure, platform, applications, or data in an integrated manner.

The different illustrative embodiments recognize and take into account that, in cases of cloud computing, server, network, data, and applications used in processing the enterprise workload may reside within an enterprise data center, may be with partners of the enterprise, or may reside over the Internet in a public cloud. Thus, processing a workload using a combination of on-premise enterprise resources and public cloud resources involves using some of the on-premise infrastructure, platform, applications, or data as well as some off-premise cloud based services and data. Cloud computing solutions of this type may create integration, interoperability, management and security challenges.

For example, the different illustrative embodiments recognize and take into account that cloud computing consumers desire to maintain a seamless interface across on-premise and off-premise cloud boundaries. However, the governing policies for cloud operation and security related procedures always need to be in place. These competing requirements create the need for an integrated infrastructure and management solution that can span across the consumer data center and into one or more public cloud environments.

The different illustrative embodiments recognize and take into account that easy access to public cloud services allows such services to be consumed within an enterprise in a non-centralized and unmanaged manner. De-centralizing and moving data processing resources to off-site vendors increases the complexity and time required to support them. Typically, this complexity is only evident when the cloud resources being consumed are reported to the enterprise information technology department. Security and system governance lapses may result from this lack of management. Regulatory and business compliance may require policy based data sharing across a hybrid cloud. However, current unmanaged methods for accessing cloud service resources cannot guarantee such compliance. The different illustrative embodiments also recognize and take into account the desirability of controlling cloud vendor selection based on business conditions and established policies.

The different illustrative embodiments recognize and take into account that policy based workload management across a hybrid cloud and automated support of cloud computing services will reduce information technology costs. Such hybrid cloud management and support will improve security and compliance and thereby will increase enterprise adoption of cloud technologies.

Various providers of cloud services use vendor specific service request, access, and consumption models. The different illustrative embodiments recognize and take into account the desirability of a vender neutral and service specific interface to all clouds that provide a desired cloud service.

The different illustrative embodiments recognize and take into account that integrated monitoring of data processing resources and workload processing across a hybrid cloud is needed to establish automated policy based workload management. However, such integrated monitoring cannot be achieved using existing solutions. Existing solutions for monitoring data processing resources and workload processing are not adapted for the dynamic nature of hybrid cloud computing environments. In particular, such solutions are not adapted for hybrid cloud environments formed of separate dynamic networks of data processing resources that often must be separated from each other by firewalls to provide appropriate levels of security.

Therefore, the different illustrative embodiments recognize and take into account the need for an integrated infrastructure and monitoring solution that can span across a hybrid cloud computing environment. In particular, the different illustrative embodiments recognize and take into account the need for an integrated infrastructure and monitoring solution that can span across a customer data center into one or more public cloud environments. The different illustrative embodiments recognize and take into account that consumers of data processing resources desire to view the state of a workload running on a hybrid cloud using a single integrated view. An integrated infrastructure and monitoring solution in accordance with an illustrative embodiment makes possible such an integrated view.

The different illustrative embodiments also recognize and take into account that such an integrated infrastructure and monitoring solution should be implemented and maintained as efficiently as possible. For example, any required changes to monitoring agents or to other parts of the monitoring infrastructure should be minimized and confined to as few components as possible. Currently available solutions for monitoring data processing resources and workload processing do not provide such efficiency. Currently available solutions for monitoring data processing resources and workload processing are too cumbersome to set up and use, particularly in a hybrid cloud computing environment.

In accordance with an illustrative embodiment, a hybrid cloud integrator provides for integration of on-premise infrastructure, platform, applications, and data with public cloud based infrastructure, platform, services and data. A hybrid cloud integrator, in accordance with an illustrative embodiment, may be used to extend on-premise data center capabilities by augmenting such capabilities with data processing capabilities provided in a public cloud. For example, such cloud based capabilities may include infrastructure as a service or storage as a service capabilities. In accordance with an illustrative embodiment, the desired solution for processing a workload may be implemented in a hybrid cloud environment that integrates multiple private cloud and public cloud based services.

A hybrid cloud integrator, in accordance with an illustrative embodiment, may be used to extend the reach of a consumer's on-premise data processing monitoring and management functionality to monitor and manage the data processing resource capabilities extended in a public cloud. In accordance with an illustrative embodiment, a hybrid cloud computing environment including both private cloud and public cloud based services may be monitored and managed in a more effective manner as a single logical cloud of resources. Hybrid cloud integration, in accordance with an illustrative embodiment, allows policy based integration of infrastructure, services, and data across the hybrid cloud. In accordance with an illustrative embodiment, monitoring and management of the integrated infrastructure and services can be performed in a centralized manner. In this way, workload specific actions can be taken consistently and in a vendor neutral manner even if the components of the workload are processed using multiple cloud based services.

In accordance with an illustrative embodiment, a hybrid cloud integrator provides an integration platform for integrating workload monitoring and management across a hybrid cloud. The hybrid cloud integrator, in accordance with an illustrative embodiment, may comprise a hybrid cloud integrator framework. Hybrid cloud integration components may be plugged-in to the framework as needed in a systematic manner.

For example, in accordance with an illustrative embodiment, integration components that may be plugged-in to the hybrid cloud integrator framework may include a cloud service broker plug-in, a cloud monitoring plug-in, and a cloud security services plug-in. Together, the plug-ins may be used to provision and configure an on-premise or consumer side monitoring gateway and an off-premise or provider cloud side monitoring gateway. These gateways are employed to provide for integrated workload monitoring across a hybrid cloud.

In accordance with an illustrative embodiment, a consumer of data processing resources may use the integration components provided in the hybrid cloud integrator to identify and define hybrid cloud monitoring participants across the hybrid cloud. Such participants may include both an on-premise monitoring infrastructure and one or more off-premise cloud based services that are to be monitored using the on-premise monitoring infrastructure. The consumer of data processing resources may specify parameters needed to enable integration for hybrid cloud monitoring. For example, such parameters may include port identifications, Internet Protocol or other addresses, encryption methods used, and the like. Coordination of actions among the integration component plug-ins is automated so that implementation of the hybrid cloud monitoring setup may be completed automatically. Thus, illustrative embodiments provide for the efficient set up of an integrated infrastructure and monitoring solution for hybrid cloud monitoring.

In accordance with an illustrative embodiment, data processing service instances in a cloud may be monitored using monitoring agents. The monitoring agents may provide monitored data to an on-premise monitoring infrastructure via the hybrid cloud integration structure established using the hybrid cloud integrator. In accordance with an illustrative embodiment, as additional data processing service instances are established in the cloud, or as data processing service instances are terminated, monitoring of already established or remaining instances may continue without requiring changes in the monitoring agents for those instances or in the rest of the monitoring infrastructure. Thus, illustrative embodiments provide for the efficient maintenance and operation of an integrated infrastructure and monitoring solution for hybrid cloud monitoring.

The different illustrative embodiments recognize and take into account that current cloud based services accessible over the internet are provided by multiple vendors. Multiple vendors may offer directly competing services. For example, both IBM SBDTC and Amazon EC2 offer infrastructure as a service cloud services. Different protocols and application programming interfaces are required for interfacing with these competing services. Currently, consumers of these services have to develop and maintain vendor-specific code to access the same service from different vendors. Consumers of cloud computing services would prefer to maintain a single vendor neutral and service specific interface to all clouds that provide a desired service. Consumers also desire to control vendor selection based on business considerations.

In accordance with an illustrative embodiment, a cloud service broker, a cloud security service, and a cloud monitoring service may be provided as plug-in components for a hybrid cloud integrator. These three components may operate together automatically to set up and provide monitoring of data processing resources across a hybrid cloud.

The different illustrative embodiments recognize and take into account that when a workload is processed in a hybrid cloud environment, processing may be distributed across multiple cloud domains. For example, workload processing may be distributed across on-premise, off-premise, private cloud, public cloud, and other domains in the hybrid cloud environment. Furthermore, the composition of workload processing across the multiple cloud domains may vary over time. Nevertheless, it is desirable to be able to manage the entire workload across the various hybrid cloud domains as a whole for performance and other service level agreement characteristics, regardless of where the components of the workload are processed. However, correlation and aggregation of data processing resource component characteristics across the various domains of the hybrid cloud may be challenging.

The different illustrative embodiments also recognize and take into account that key performance indicators may vary from workload to workload. An event correlation service that is able to adopt strategies to aggregate low level monitored data and correlate events of interest is desirable.

The illustrative embodiments solve the problem of correlating and aggregating workload characteristics using low level monitored data and events collected from monitoring of resources and services across a hybrid cloud. The illustrative embodiments allow administrators to define workload specific events or situations of interest. Illustrative embodiments also provide for automation of the process of aggregating and filtering workload specific events of interest by monitoring observable workload and resource characteristics, aggregating and building events, and then creating correlations among the events so that events of interest may be identified and appropriate actions taken. The illustrative embodiments may use hybrid cloud monitoring capabilities for correlating events across a hybrid cloud data processing environment. In accordance with an illustrative embodiment, the occurrence of specific events of interest may be observed in the hybrid cloud environment. Observation of the occurrence of these events may operate as a trigger mechanism. In response to determining that an event of interest has occurred, notifications and other action items may be injected automatically into proactive or reactive workload management systems.

The illustrative embodiments provide a method and apparatus for a plug-in oriented modular and programmable event correlation service.

Figure 4:
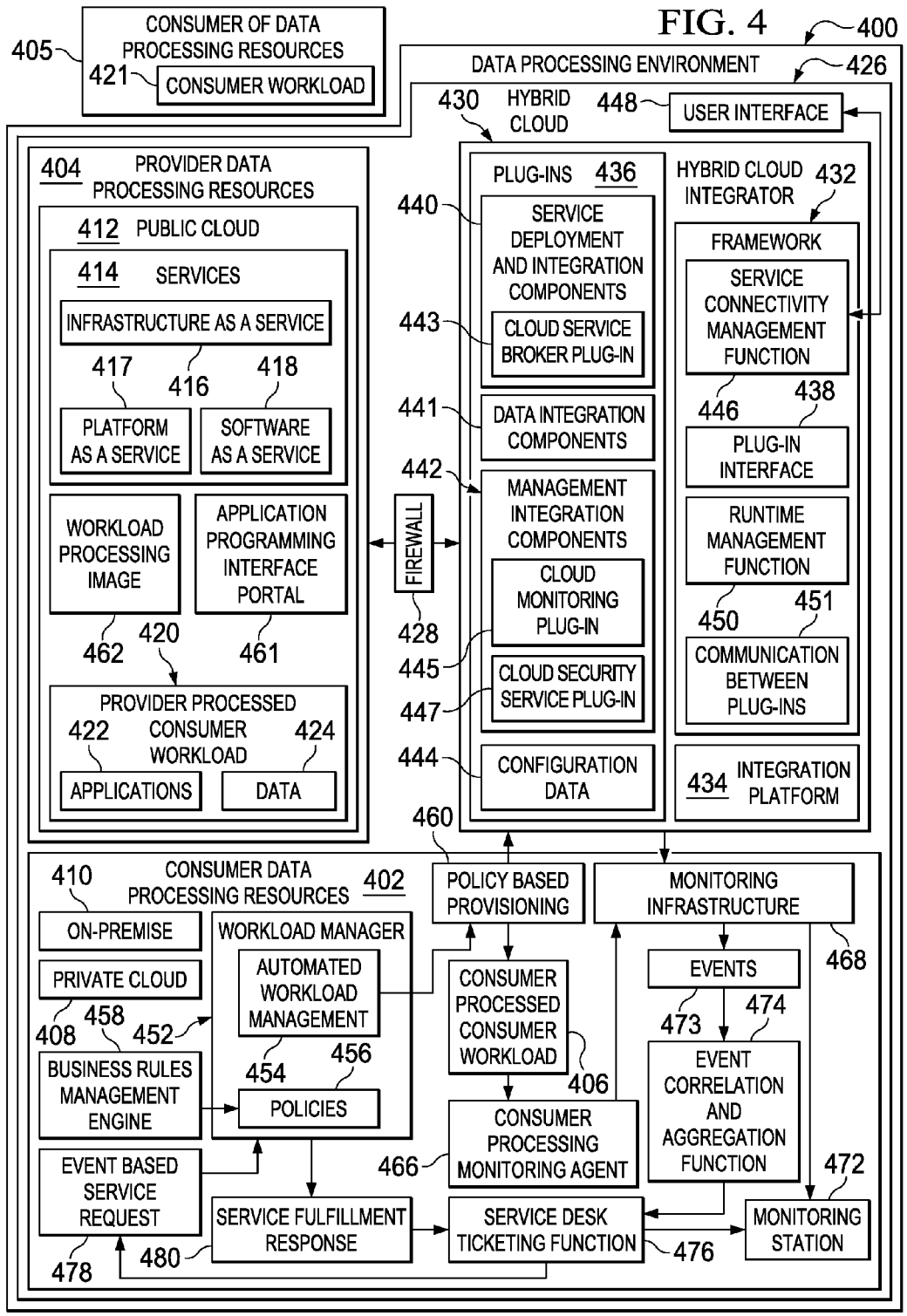
FIG. 4 is a block diagram of a data processing environment employing hybrid cloud integration in accordance with an illustrative embodiment.

Referring now to FIG. 4, a block diagram of a data processing environment employing hybrid cloud integration is depicted in accordance with an illustrative embodiment. Data processing environment 400 includes consumer data processing resources 402 and provider data processing resources 404. In some embodiments, provider data processing resources 404 may be referred to as first data processing resources, and consumer data processing resources 402 may be referred to as second data processing resources or vice versa.

Consumer data processing resources 402 may include data processing resources that are owned or controlled exclusively by consumer of data processing resources 405. For example, consumer of data processing resources 405 may be a business entity or other organization or enterprise that uses consumer data processing resources 402 to process consumer processed consumer workload 406.

Consumer data processing resources 402 may include any combination of data processing systems and devices for processing consumer processed consumer workload 406. For example, consumer data processing resources 402 may include any combination of data processing infrastructure, networks, processors, data storage, databases, and applications.

Consumer data processing resources 402 may include or may be referred to as private cloud 408. Consumer data processing resources 402 may include data processing resources that are located on-premise 410 or may be referred to as being on-premise 410. On-premise 410 may mean that all of consumer data processing resources 402 are co-located in a single location that is owned or controlled by consumer of data processing resources 405 that also owns or controls consumer data processing resources 402. Alternatively, on-premise 410 may mean that consumer data processing resources 402 are under the control of consumer of data processing resources 405 for exclusive use by consumer of data processing resources 405, even though some or all of consumer data processing resources 402 are physically located in a number of remote locations.

Provider data processing resources 404 are data processing resources that are available to be shared by a number of consumers of data processing resources, including consumer of data processing resources 405. Provider data processing resources 404 may include any combination of data processing systems or devices. For example, provider data processing resources 404 may include any combination of data processing infrastructure, networks, processors, data storage, or applications.

Provider data processing resources 404 may be provided as services 414. For example, provider data processing resources 404 may be provided as services 414 by public cloud 412. Public cloud 412 makes provider data processing resources 404 available to consumer of data processing resources 405 as services 414. For example, services 414 may include one or more of infrastructure as a service 416, platform as a service 417, software as a service 418, or other data processing related services.

At certain times, consumer of data processing resources 405 may use provider data processing resources 404 to process provider processed consumer workload 420. Provider processed consumer workload 420 typically is a portion of all of consumer workload 421 that consumer of data processing resources 405 needs to be processed. In some cases, provider processed consumer workload 420 may be all of consumer workload 421 that consumer of data processing resources 405 needs to be processed. For example, consumer of data processing resources 405 may use provider data processing resources 404 to process provider processed consumer workload 420 when consumer data processing resources 402 are overloaded with processing consumer processed consumer workload 406. At other times, consumer of data processing resources 405 may employ provider data processing resources 404 to process provider processed consumer workload 420 when processing of provider processed consumer workload 420 is not one of the core competencies of consumer of data processing resources 405. As another example, consumer of data processing resources 405 may use provider data processing resources 404 to process provider processed consumer workload 420 when particular applications required to process provider processed consumer workload 420 are not available among consumer data processing resources 402. In any case, processing of provider processed consumer workload 420 using provider data processing resources 404 may require that a number of applications 422 or data 424, or both applications 422 and data 424, be provided to provider data processing resources 404 in order to process provider processed consumer workload 420.

Thus, at times, all of consumer workload 421 being processed by or for consumer of data processing resources 405 may be processed in part as consumer processed consumer workload 406 on consumer data processing resources 402, such as private cloud 408, and in part as provider processed consumer workload 420 on provider data processing resources 404, such as public cloud 412. In this case, the integration of private cloud 408 and public cloud 412 to process consumer workload 421 for consumer of data processing resources 405 forms hybrid cloud 426.

Operation of hybrid cloud 426 requires communication between consumer data processing resources 402 and provider data processing resources 404. However, security concerns may require the prevention of unauthorized access to consumer data processing resources 402 from provider data processing resources 404 or from any other unauthorized sources. Therefore, firewall 428 may be provided between consumer data processing resources 402 and provider data processing resources 404. Firewall 428 is designed to block unauthorized access to consumer data processing resources 402 by provider data processing resources 404 or by any other unauthorized sources while permitting authorized communications between consumer data processing resources 402 and provider data processing resources 404. Firewall 428 may be implemented in either hardware or software or using a combination of both hardware and software. For example, without limitation, firewall 428 may be implemented in consumer data processing resources 402.

In accordance with an illustrative embodiment, hybrid cloud integrator 430 provides integration across consumer data processing resources 402 and provider data processing resources 404 to implement integrated data processing resources forming hybrid cloud 426. For example, without limitation, hybrid cloud integrator 430 may be implemented by consumer of data processing resources 405 on consumer data processing resources 402.

In accordance with an illustrative embodiment, hybrid cloud integrator 430 includes framework 432, integration platform 434, and a number of plug-ins 436. For example, framework 432 may be implemented in software as a software framework. Framework 432 may be implemented on integration platform 434. Integration platform 434 provides the underlying hardware and software required to implement hybrid cloud integrator 430. For example, integration platform 434 may include the hardware, operating system, and runtime environment in which hybrid cloud integrator 430 is implemented.

Framework 432 provides plug-in interface 438. Plug-in interface 438 allows a number of plug-ins 436 to be installed in hybrid cloud integrator 430. Plug-ins 436 are software components that are configured to provide functionality for integrated use of consumer data processing resources 402 and provider data processing resources 404. Plug-ins 436 may include, for example, a number of service deployment and integration components 440, a number of data integration components 441, and a number of management integration components 442.

In accordance with an illustrative embodiment, service deployment and integration components 440 may be used by consumer of data processing resources 405 to deploy services 414 in provider data processing resources 404 that are needed to process or monitor provider processed consumer workload 420. Service deployment and integration components 440 also may be used to integrate services 414 deployed in provider data processing resources 404 with consumer data processing resources 402 to provide integrated data processing resources to process consumer workload 421. For example, service deployment and integration components 440 may include cloud service broker plug-in 443. As will be described in more detail below, cloud service broker plug-in 443 may be used for provisioning provider data processing resources 404 in public cloud 412 for use by consumer of data processing resources 405.

Data integration components 441 may be used by consumer of data processing resources 405 to migrate, replicate, transform, and integrate data used in processing consumer workload 421 between consumer data processing resources 402 and provider data processing resources 404. Service deployment and integration components 440 and data integration components 441 may be used to enforce workload and data specific deployment and integration policies specified by consumer of data processing resources 405.

Management integration components 442 may include any components that may be used by consumer of data processing resources 405 to monitor and manage the processing of provider processed consumer workload 420 by provider data processing resources 404. Management integration components 442 may include plug-in components that may be used by consumer of data processing resources 405 to monitor the processing of provider processed consumer workload 420 by provider data processing resources 404 in order to manage such processing. For example, management integration components 442 may include cloud monitoring plug-in 445 and cloud security service plug-in 447. As will be described in more detail below, cloud monitoring plug-in 445 may be used for managing monitoring of processing of provider processed consumer workload 420 on provider data processing resources 404. Cloud security service plug-in 447 may be used for managing security for the monitoring of the processing of provider processed consumer workload 420 on provider data processing resources 404. Management integration components 442 may also, or alternatively, include metering components or other management related components.

Operating characteristics of plug-ins 436 are defined by configuration data 444. In accordance with an illustrative embodiment, framework 432 may provide service connectivity management function 446. Service connectivity management function 446 allows current configuration data 444 from plug-ins 436, and other information about plug-ins 436, to be made available to a user on user interface 448. Service connectivity management function 446 also allows configuration data 444 to be received from user interface 448 for plug-ins 436. Thus, service connectivity management function 446 provides a connection between plug-ins 436 and user interface 448 allowing users to view and change the operating configuration of plug-ins 436 via user interface 448.

Framework 432 also may provide runtime management function 450. Runtime management function 450 provides for managing operation of plug-ins 436 during operation thereof. Specifically, runtime management function 450 may provide for activating plug-ins 436 and for controlling operation of plug-ins 436 after plug-ins 436 are activated.

Framework 432 also may provide communication between plug-ins 451. Communication between plug-ins 451 allows plug-ins 436 to interact with each other. For example, communication between plug-ins 451 allows one of plug-ins 436 to access and make use of the functionality provided by another of plug-ins 436 in framework 432.

In accordance with an illustrative embodiment, hybrid cloud integrator 430 provides flexible and reliable automated integration of data processing resources across hybrid cloud 426 to process a workload. For example, hybrid cloud integrator 430 may be used by workload manager 452 to access provider data processing resources 404 automatically when needed to supplement consumer data processing resources 402. Hybrid cloud integrator 430 also may be used by workload manager 452 to monitor the processing of provider processed consumer workload 420 by provider data processing resources 404.

Workload manager 452 may provide automated workload management 454. Automated workload management 454 includes automatically managing workload processing on available data processing resources. An example of a system that provides this type of automated workload management is the IBM® Tivoli® Service Automation Manager, TSAM, available from International Business Machines Corporation. Illustrative embodiments may be used, however, in combination with any currently available workload manager providing automated workload management functions or with any workload manager that may become available in the future. Illustrative embodiment also may be used in combination with workload managers in which automated workload management functions are implemented in combination with a human operator.

Workload manager 452 may provide automated workload management 454 based on policies 456. Policies 456 may define limitations under which workload manager 452 may use available data processing resources. For example, policies 456 may define when or under what conditions workload manager 452 may use provider data processing resources 404 to process consumer workload 421. Policies 456 also may specify which provider data processing resources 404 may be used to process consumer workload 421. Policies 456 also may specify consumer data that may be replicated and accessed by provider data processing resources 404 and the portion of consumer workload 421 that may be processed by provider data processing resources 404. Policies 456 may specify security and privacy constraints that must be applied for processing consumer workload 421 by provider data processing resources 404.

Policies 456 may be developed using business rules management engine 458. Business rules management engine 458 may take into consideration a variety of business related and other factors to determine policies 456. For example, factors used by business rules management engine 458 to determine policies 456 may include financial, security, compliance, customer relations factors, or other suitable factors.

Workload manager 452 may provide automatic policy based provisioning 460 based on policies 456. For example, policy based provisioning 460 may call for the provisioning of provider data processing resources 404 to process provider processed consumer workload 420. In this case, workload manager 452 may use hybrid cloud integrator 430 to deploy provider data processing resources 404 needed to process provider processed consumer workload 420. For example, service deployment and integration components 440 may be used to deploy services 414 in public cloud 412 that are needed to process provider processed consumer workload 420. Service deployment and integration components 440 may establish communication with provider data processing resources 404 through firewall 428. For example, such communication may be established via application programming interface portal 461 in public cloud 412. Applications 422, data 424, or both applications 422 and data 424 needed for processing provider processed consumer workload 420 may be provided to provider data processing resources 404 by workload manager 452 via hybrid cloud integrator 430.

Hybrid cloud integrator 430 also may be used to establish workload processing image 462 in public cloud 412. Workload processing image 462 pre-defines services 414 needed to process provider processed consumer workload 420. By establishing workload processing image 462 in advance, provider data processing resources 404 needed to process provider processed consumer workload 420 may be deployed more rapidly when workload manager 452 determines that provider data processing resources 404 will be used for this purpose.

In accordance with an illustrative embodiment, hybrid cloud integrator 430 allows workload manager 452 to access provider data processing resources 404 as easily as consumer data processing resources 402. Plug-ins 436 in hybrid cloud integrator 430 handle all of the special requirements of provider data processing resources 404 needed to access those resources.

In accordance with an illustrative embodiment, hybrid cloud integrator 430 also provides for monitoring the processing of provider processed consumer workload 420 by provider data processing resources 404. For example, as will be described in more detail below, service deployment and integration components 440 and management integration components 442 may be used to establish and manage monitoring of the processing of provider processed consumer workload 420. Monitored data from provider data processing resources 404 may be provided to monitoring infrastructure 468 via hybrid cloud integrator 430. Similarly, consumer processing monitoring agent 466 may be implemented in consumer data processing resources 402. Consumer processing monitoring agent 466 collects data for monitoring the processing of consumer processed consumer workload 406 by consumer data processing resources 402. Monitored data from consumer data processing resources 402 may be provided from consumer processing monitoring agent 466 to monitoring infrastructure 468.

Monitoring infrastructure 468 may be implemented in consumer data processing resources 402. Monitoring infrastructure 468 may receive monitoring information for provider data processing resources 404 via hybrid cloud integrator 430 and monitoring information from consumer processing monitoring agent 466 for consumer data processing resources 402. Monitoring infrastructure 468 may process the received monitoring information to generate an integrated display of workload processing conditions for provider data processing resources 404 and consumer data processing resources 402. This integrated display may be presented to a user, such as a system administrator, on monitoring station 472. Thus, in accordance with an illustrative embodiment, a display of workload processing conditions across hybrid cloud 426 may be presented to a user in an integrated manner. Such an integrated display allows a user to monitor and manage workload processing across hybrid cloud 426 in an integrated, effective, and efficient manner.

Monitoring infrastructure 468 also may look for and detect the occurrence of events 473 from the monitoring information provided to monitoring infrastructure 468. Events 473 may be defined by the occurrence of specified conditions or patterns in the monitored data. For example, monitored data exceeding a defined threshold for at least a specified time period may indicate the occurrence of one of events 473. In accordance with an illustrative embodiment, events 473 may be defined by the occurrence of any condition, state, or pattern of interest in the monitored data provided to monitoring infrastructure 468.

Events 473 may be provided as input to event correlation and aggregation function 474. Event correlation and aggregation function 474 may provide, and may be referred to as, an event correlation service. For example, event correlation and aggregation function 474 may be implemented as an event correlation service for correlating and aggregating workload characteristics using low level monitored data and events collected from monitoring of resources and services across hybrid cloud 426. Event correlation function 474 may be implemented as a plug-in oriented modular and programmable event correlation service as described in more detail below.

Event correlation and aggregation function 474 may aggregate and correlate events 473 over periods of time. Event correlation and aggregation function 474 may determine whether the aggregated and correlated events 473 indicate the presence of data processing conditions that should be or may be addressed to maintain or improve system performance. For example, event correlation and aggregation function 474 may determine that a series of detected events 473 has occurred indicating that consumer data processing resources 402 or provider data processing resources 404 are overloaded. Similarly, event correlation and aggregation function 474 may determine that a series of detected events 473 has occurred indicating that consumer data processing resources 402 or provider data processing resources 404 are being underutilized. In accordance with an illustrative embodiment, any data processing condition of interest that may be defined by aggregated or correlated events 473 may be detected by event correlation and aggregation function 474.

In response to a determination by event correlation and aggregation function 474 that a data processing condition of interest exists, service desk ticketing function 476 may send event based service request 478 to workload manager 452. For example, service desk ticketing function 476 may generate event based service request 478 in response to a determination by event correlation and aggregation function 474 that a data processing condition exists that should be or may be addressed to maintain or improve system performance. Event based service request 478 may indicate to workload manager 452 the particular condition that has been determined to exist. In this case, workload manager 452 may determine the appropriate action to take in response to the indicated condition. Alternatively, service desk ticketing function 476 may determine the action that needs to be taken in response to a particular condition that has been determined to exist. In this case, event based service request 478 may indicate to workload manager 452 the action that is being requested.

In any case, workload manager 452 may determine whether or not any action may be taken in response to a particular data processing condition based on policies 456. If workload manager 452 determines that action will be taken in response to a particular data processing condition, workload manager 452 may implement such action based on policies 456. For example, workload manager 452 may respond to event based service request 478 by implementing appropriate policy based provisioning 460 of data processing resources as needed to respond to a detected data processing condition.

Workload manager 452 also may respond to event based service request 478 by generating service fulfillment response 480. For example, service fulfillment response 480 may be generated by workload manager 452 and delivered to service desk ticketing function 476. Service fulfillment response 480 may indicate that event based service request 478 has been received by workload manager 452. Service fulfillment response 480 also may indicate that appropriate action has been taken, or will be taken, in response to event based service request 478. In this case, service fulfillment response 480 may or may not specify the particular action taken, or to be taken, by workload manager 452 in response to event based service request 478. In some cases, workload manager 452 may not be able to take action to change data processing conditions in response to event based service request 478. For example, policies 456 may prevent workload manager 452 from taking action in response to event based service request 478 at a particular time. In this case, service fulfillment response 480 may indicate that action will not be taken by workload manager 452 in response to event based service request 478 or that the implementation of such action may be delayed. Policies 456, responsible for such a failure to act or for such a delay, may or may not be identified in service fulfillment response 480.

The information provided by event based service request 478 and service fulfillment response 480 may be formatted appropriately and displayed for a user on monitoring station 472. By displaying information from event based service request 478 and service fulfillment response 480 in this manner, a user is able to monitor the detection of data processing system conditions for which an appropriate action may be taken and the response of workload manager 452 to the detection of such conditions.

In accordance with an illustrative embodiment, hybrid cloud integrator 430 makes it possible for workload manager 452 to respond to determined data processing conditions of interest in consumer data processing resources 402, in provider data processing resources 404, or both. Furthermore, hybrid cloud integrator 430 makes it possible for workload manager 452 to access consumer data processing resources 402, provider data processing resources 404, or both, for responding to determined conditions of interest. Thus, hybrid cloud integrator 430 makes it possible for workload manager 452 to provide integrated data processing resource management across hybrid cloud 426 by providing for monitoring of data processing conditions across hybrid cloud 426 and by providing access to data processing resources across hybrid cloud 426 when responding to such conditions.

For example, hybrid cloud integrator 430 may be used to establish monitoring of the processing of portions of consumer workload 421 by provider data processing resources 404 while processing of other portions of consumer workload 421 by consumer data processing resources 402 also is monitored at the same time. Based on such monitoring, an overload condition or underutilization condition on consumer data processing resources 402, on provider data processing resources 404, or both, may be determined. In response to such a determination, workload manager 452 may activate or deactivate selected consumer data processing resources 402, may deploy or release selected provider data processing resources 404 using hybrid cloud integrator 430 in the manner described, or both. Processing of portions of consumer workload 421 then may be allocated by workload manager 452 across the reconfigured resources of hybrid cloud 426 to remedy the determined overload or underutilization condition. The particular action taken by workload manager 452 in response to the determined condition may be determined by policies 456.

Figure 5:
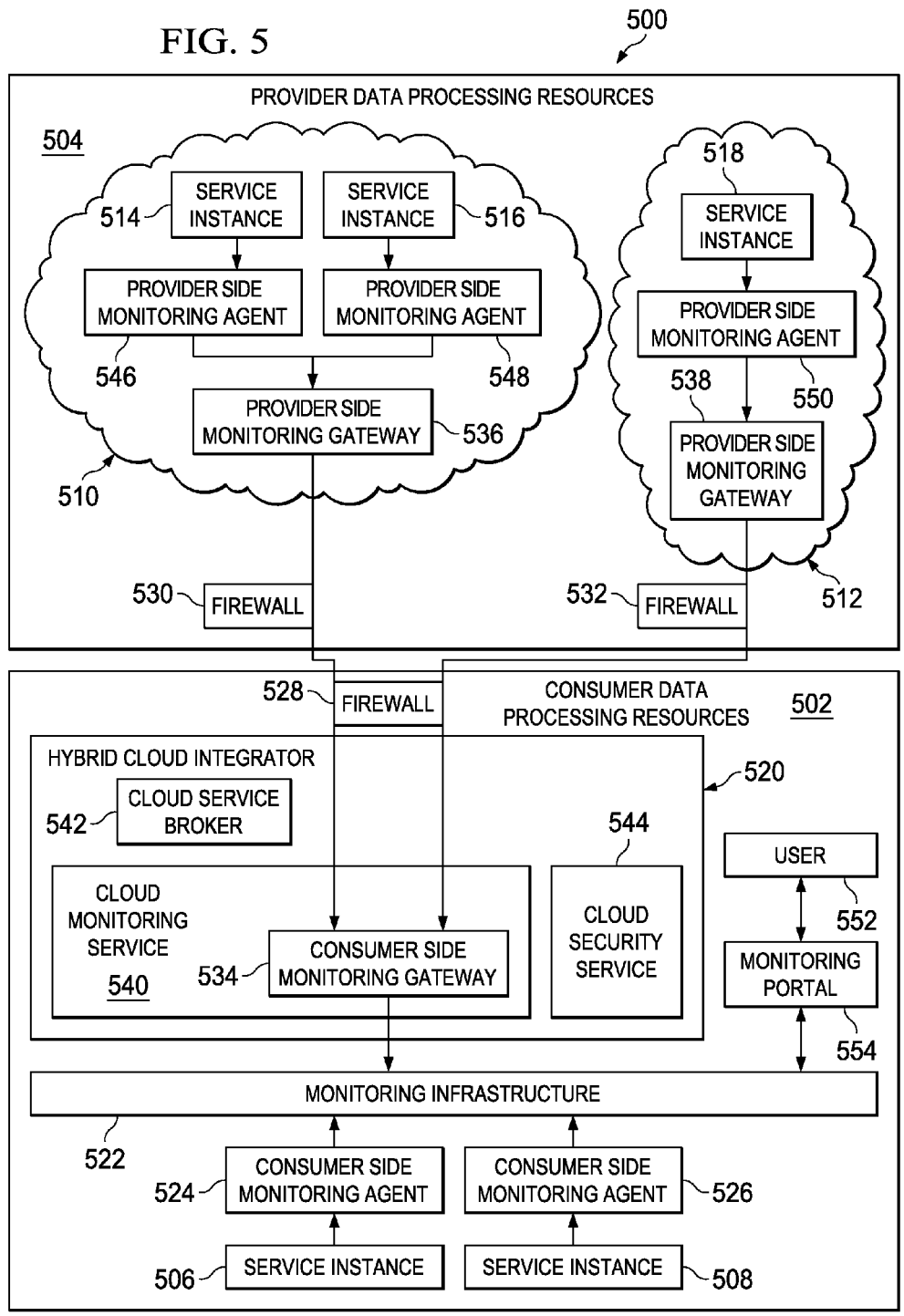
FIG. 5 is a block diagram of a data processing environment for monitoring data processing resources in accordance with an illustrative embodiment.

Turning now to FIG. 5, a block diagram of a data processing environment for monitoring data processing resources in accordance with an illustrative embodiment is depicted. In this example, data processing environment 500 is an example of one implementation of data processing environment 400 in FIG. 4. In this example, data processing environment 500 comprises consumer data processing resources 502 and provider data processing resources 504. One or more of consumer data processing resources 502 and provider data processing resources 504 may comprise cloud based resources, in which the data processing resources are provided as a service. In this case, data processing environment 500 may be referred to as a hybrid cloud.

Consumer data processing resources 502 may comprise, for example, on-premise data processing resources. For example, consumer data processing resources 502 may comprise data processing resources found in a customer data center. In other examples, consumer data processing resources 502 may comprise cloud based resources in which consumer data processing resources 502 are provided as a service. For example, consumer data processing resources 502 may comprise private cloud or public cloud data processing resources. In any case, various applications, middleware components, and other workload processing resources, such as those represented by service instances 506 and 508, may be installed, provisioned, and configured by a consumer of data processing resources on consumer data processing resources 502. These processing resources may be referred to as workload processing service instances or simply as service instances. For example, service instances 506 and 508 may be instantiated on consumer data processing resources 502 to process all or portions of a consumer workload.

Provider data processing resources 504 may comprise cloud based resources that are provided as a service. For example, provider data processing resources 504 may comprise infrastructure as a service, platform as a service, software as a service, or other cloud services. In this example, provider data processing resources 504 comprise public clouds 510 and 512. Public clouds 510 and 512 may be provided by different vendors. In this case, knowledge of different application programming interfaces and other requirements may be needed in order to access the services on public clouds 510 and 512.

Various cloud provided service instances 514, 516, and 518 may be provisioned and configured to process the workload of a consumer of data processing resources in public clouds 510 and 512. For example, service instances 514, 516, and 518 may be provisioned and configured by a consumer of cloud data processing resources to process portions of a consumer workload. The consumer of cloud data processing resources may employ hybrid cloud integrator 520 to provision resources on public clouds 510 and 512 to instantiate service instances 514, 516, and 518. In this example, hybrid cloud integrator 520 is implemented on consumer data processing resources 502.

A consumer of data processing resources will desire to manage service instances 506, 508, 514, 516, and 518 across data processing environment 500 in an integrated manner. Such integrated management requires integrated monitoring of service instances 506, 508, 514, 516, and 518 across data processing environment 500. Such integrated monitoring may be provided by monitoring infrastructure 522. For example, monitoring infrastructure 522 may be implemented on consumer data processing resources 502. Monitoring infrastructure 522 may be implemented using any combination of hardware and software components to provide the desired integrated monitoring functionality. For example, without limitation, monitoring infrastructure 522 may comprise an IBM Tivoli monitoring server for providing such integrated monitoring.

Monitoring of service instances 506 and 508 on consumer data processing resources 502 may be straightforward. Consumer side monitoring agents 524 and 526 may be implemented on consumer data processing resources 502 to monitor service instances 506 and 508, respectively. Consumer side monitoring agents 524 and 526 may be implemented in any manner to provide the desired functionality for monitoring service instances 506 and 508 and providing monitored data to monitoring infrastructure 522. For example, consumer side monitoring agents 524 and 526 may push such monitored data to monitoring infrastructure 522. For example, without limitation, consumer side monitoring agents 524 and 526 may comprise IBM Tivoli monitoring agents.

Monitoring of service instances 514, 516, and 518 on provider data processing resources 504 by monitoring infrastructure 522 may be more problematic. In many cases, provider data processing resources 504 may be separated from consumer data processing resources 502 by one or more firewalls 528, 530, and 532. For example, firewalls 530 and 532 may be provided by or associated with public clouds 510 and 512, respectively. Firewall 528 may be provided by or associated with consumer data processing resources 502. In this case, firewall 528 may be implemented to prevent unauthorized access to consumer data processing resources 502 from outside of consumer data processing resources 502. In particular, firewall 528 may prevent data from being pushed from provider data processing resources 504 to consumer data processing resources 502.

In accordance with an illustrative embodiment, monitoring of service instances 514, 516, and 518 on provider data processing resources 504 by monitoring infrastructure 522 is enabled by consumer side monitoring gateway 534 operating in combination with provider side monitoring gateways 536 and 538. In accordance with an illustrative embodiment, consumer side monitoring gateway 534 and provider side monitoring gateways 536 and 538 may be implemented using hybrid cloud integrator 520.

In accordance with an illustrative embodiment, consumer side monitoring gateway 534 may be implemented by cloud monitoring service 540 implemented in hybrid cloud integrator 520. For example, cloud monitoring service 540 may be implemented as a cloud monitoring plug-in to the software framework provided by hybrid cloud integrator 520. Consumer side monitoring gateway 534 may pull monitored data across firewall 528 from provider side monitoring gateways 536 and 538. Consumer side monitoring gateway 534 may then push such monitored data to monitoring infrastructure 522.

Provider side monitoring gateways 536 and 538 may be provisioned, configured, and deployed using cloud service broker 542, cloud security service 544, and cloud monitoring service 540. For example, cloud service broker 542 may be implemented as a cloud service broker plug-in to the software framework provided by hybrid cloud integrator 520. Cloud service broker 542 may be used to provision provider side monitoring gateways 536 and 538 in public clouds 510 and 512, respectively. Cloud service broker 542 also may be used by a consumer of data processing resources to provision resources in public clouds 510 and 512 for service instances 514, 516, and 518. Cloud service broker 542 may provide a vendor neutral interface for a consumer of data processing resources to access provider data processing resources 504 on various public clouds 510 and 512 without requiring specific knowledge of various different cloud interfaces by the consumer of data processing resources.

After provider side monitoring gateways 536 and 538 are provisioned by cloud service broker 542, cloud service broker 542 may activate cloud security service 544. Cloud security service 544 may be implemented as a cloud security service plug-in to the software framework provided by hybrid cloud integrator 520. Cloud security service 544 may configure the firewall and access settings of provider side monitoring gateways 536 and 538. These configuration settings may allow access to provider side monitoring gateways 536 and 538 only by authorized provider side monitoring agents 546, 548, and 550. These configuration settings also may restrict access to the monitored data collected in provider side monitoring gateways 536 and 538 to authorized consumer side monitoring gateway 534.

After cloud security service 544 has completed the security and isolation configuration of provider side monitoring gateways 536 and 538, cloud service broker 542 may activate cloud monitoring service 540 to configure and start provider side monitoring gateways 536 and 538. Cloud monitoring service 540 may configure port settings for provider side monitoring gateways 536 and 538 so that provider side monitoring agents 546, 548, and 550 can contact and communicate with their respective provider side monitoring gateway 536 or 538. Cloud monitoring service 540 also may configure provider side monitoring gateways 536 and 538 to listen on specific ports for contact by consumer side monitoring gateway 534. Cloud monitoring service 540 also may configure consumer side monitoring gateway 534 to contact provider side monitoring gateways 536 and 538 on the predefined ports and IP addresses. This configuration of provider side monitoring gateways 536 and 538 and consumer side monitoring gateway 534 by cloud monitoring service 540 allows for communication to take place between provider side monitoring gateways 536 and 538 and consumer side monitoring gateway 534.

Service instances 514, 516, and 518 may be provisioned by cloud service broker 542. When each service instance 514, 516, and 518 is provisioned, cloud monitoring service 540 may install, configure, and start a corresponding provider side monitoring agent 546, 548, and 550, respectively. Thus, to enable monitoring on service instances 514, 516, and 518 in public clouds 510 and 512, cloud service broker 542 and cloud monitoring service 540 may coordinate with each other. In one illustrative embodiment, cloud service broker 542 provisions a service instance and invokes cloud security service 544. Cloud security service 544 configures the service instances provisioned in the cloud so that cloud monitoring service 540 can access the service instance and enable monitoring of the service via a monitoring agent. As discussed elsewhere herein, cloud service broker 542, cloud security service 544, and cloud monitoring service 540 may use communication services provided by the framework of hybrid cloud integrator 520. Further, the framework of hybrid cloud integrator 520 may provide for communication between plug-in components of hybrid cloud integrator 520. The coordination between cloud service broker 542, cloud security service 544, and cloud monitoring service 540 may use communication services provided by the framework of hybrid cloud integrator 520.

Provider side monitoring agents 546, 548, and 550 may operate in a manner similar to consumer side monitoring agents 524 and 526. In particular, provider side monitoring agents 546, 548, and 550 may monitor corresponding service instances 514, 516, and 518, respectively, and provide monitored data to provider side monitoring gateways 536 and 538. This monitored data may be retained at provider side monitoring gateways 536 and 538 until the data is retrieved from provider side monitoring gateways 536 and 538 by consumer side monitoring gateway 534.

Cloud security service 544 may be implemented as a cloud security service plug-in to the software framework provided by hybrid cloud integrator 520. Cloud security service 544 may be employed by cloud service broker 542 when implementing provider side monitoring gateways 536 and 538 and provider side monitoring agents 546, 548, and 550 to implement virtual private security zones. Such security zones may be used to ensure that appropriate security is maintained between service instances 514, 516, and 518 operating on public clouds 510 and 512, while allowing for monitored data from service instances 514, 516, and 518 to be shared with provider side monitoring gateways 536 and 538 and ultimately funneled through consumer side monitoring gateway 534 to monitoring infrastructure 522. Virtual private security zones and the use thereof in various applications will be described in more detail below.

When activated, provider side monitoring agents 546, 548, and 550 monitor corresponding service instances 514, 516, and 518 and provide corresponding monitored data to provider side monitoring gateways 536 and 538. Consumer side monitoring gateway 534 may then be activated to retrieve the monitored data across firewall 528 from provider side monitoring gateways 536 and 538. The retrieved monitored data then may be provided from consumer side monitoring gateway 534 to monitoring infrastructure 522. From the point of view of monitoring infrastructure 522, monitored data from service instances 514, 516, and 518 on provider data processing resources 504 may be received from provider side monitoring agents 546, 548, and 550, respectively, in the same manner as monitored data from service instances 506 and 508 on consumer data processing resources 502 is received from consumer side monitoring agents 524 and 526, respectively. The operations performed by provider side monitoring gateways 536 and 538 and consumer side monitoring gateway 534 thus may be transparent to monitoring infrastructure 522.

Monitoring infrastructure 522 may generate an integrated view of monitored service instances 506, 508, 514, 516, and 518 across data processing environment 500 from the monitored data provided by consumer side monitoring agents 524 and 526 and provider side monitoring agents 546, 548, and 550, respectively. This integrated view of monitored services may be presented to user 552 via an interactive monitoring portal 554. For example, user 552 may be a system administrator. Monitoring portal 554 may be accessed by user 552 using a browser and used in an interactive manner on a monitoring dashboard. The integrated view of monitored services generated by monitoring infrastructure 522 also may be used to provide for fully automated or partially automated management of data processing resources across data processing environment 500. For example, the integrated view of monitored services generated by monitoring infrastructure 522 may be used by an automated workload manager to provide fully automated or partially automated integrated workload management across data processing environment 500.

Example scenarios, in accordance with illustrative embodiments, for using the components of a hybrid cloud integrator to establish integrated monitoring of data processing resources across a hybrid cloud data processing environment are presented in more detail below.

The illustrations of FIG. 4 and FIG. 5 are not meant to imply physical or architectural limitations to the manner in which different illustrative embodiments may be implemented. Other components in addition to or in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, a request to monitor a service instance may be generated automatically as part of creation of the service instance, may be generated automatically as part of modification of the service instance, or may be generated as part of a life cycle of the service instance. A request to monitor a service instance may be made by a user of the service instance, by a provider of data processing resources, or by a consumer of data processing resources. Monitored data from a service instance may be provided from self-monitoring by the service instance, from a monitoring agent configured to monitor the service instance, from a script internal to the service instance, or from a script external to the service instance.

Illustrative embodiments may be implemented for application in a hybrid cloud environment that comprises one or more public clouds in combination with one or more private clouds. Illustrative embodiments may be implemented for application in a hybrid cloud environment that may include multiple private clouds, community clouds, or public clouds in any combination. In accordance with an illustrative embodiment, a hybrid cloud integrator may be used to provide integration of data processing resources across multiple private, public, and community clouds in any combination.

A hybrid cloud integrator in accordance with an illustrative embodiment may be used for integrated monitoring and management across a hybrid cloud for purposes of detecting and responding to data processing conditions such as data processing resource overload conditions, underutilization conditions, or other conditions or combinations of conditions. For example, without limitation, a hybrid cloud integrator in accordance with an illustrative embodiment may be used to provide integrated management across a hybrid cloud for monitoring, metering, security, or any other data processing related conditions or combinations of conditions.

Integrated monitoring and management of data processing resources across a hybrid cloud using a hybrid cloud integrator in accordance with an illustrative embodiment may be implemented automatically using an automated management system, such as workload manger 452. Alternatively, monitoring and management using a hybrid cloud integrator in accordance with an illustrative embodiment may be provided by a human system manager using appropriate system interfaces, such as user interface 448, monitoring station 472, or monitoring portal 554, in combination with other appropriate system interfaces. Monitoring and management using a hybrid cloud integrator in accordance with an illustrative embodiment may be provided by an automated management system and a human system manager operating together.

Figure 6:
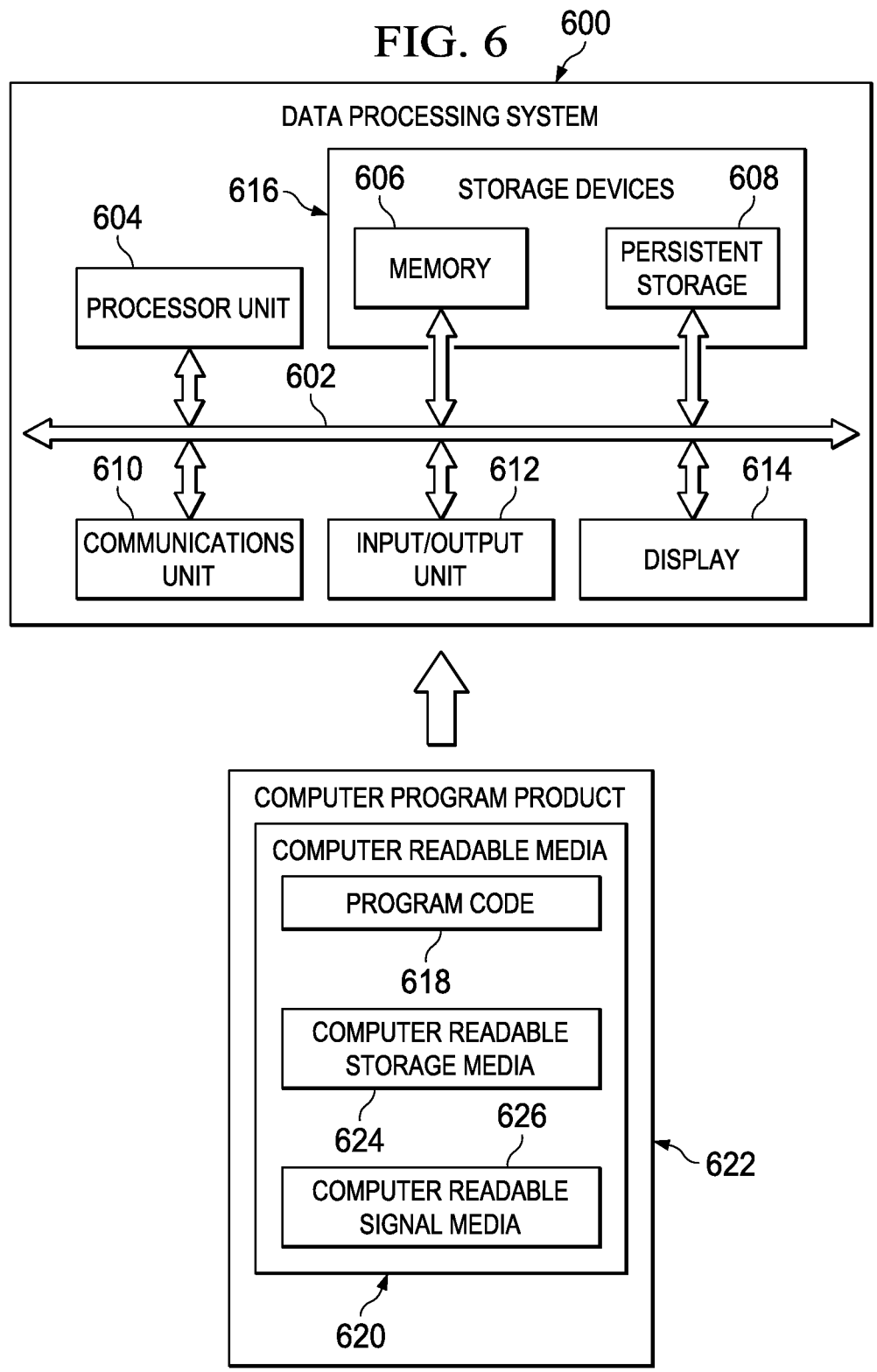
FIG. 6 is a block diagram of a data processing system in accordance with an illustrative embodiment.

Referring now to FIG. 6, a block diagram of a data processing system is depicted in accordance with an illustrative embodiment. In this example, data processing system 600 is one example of a data processing system that may be used to implement consumer data processing resources 402 and provider data processing resources 404 in FIG. 4 or consumer data processing resources 502 and provider data processing resources 504 in FIG. 5. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a number of processors, a multi-processor core, or some other type of processor, depending on the particular implementation. "A number," as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program instructions, program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, communications unit 610 may include one or more devices used to transmit and receive data, such as a modem or a network adapter. Further, a memory may be, for example, memory 606, or a cache, such as found in an interface and memory controller hub that may be present in communications fabric 602.

Figure 7:
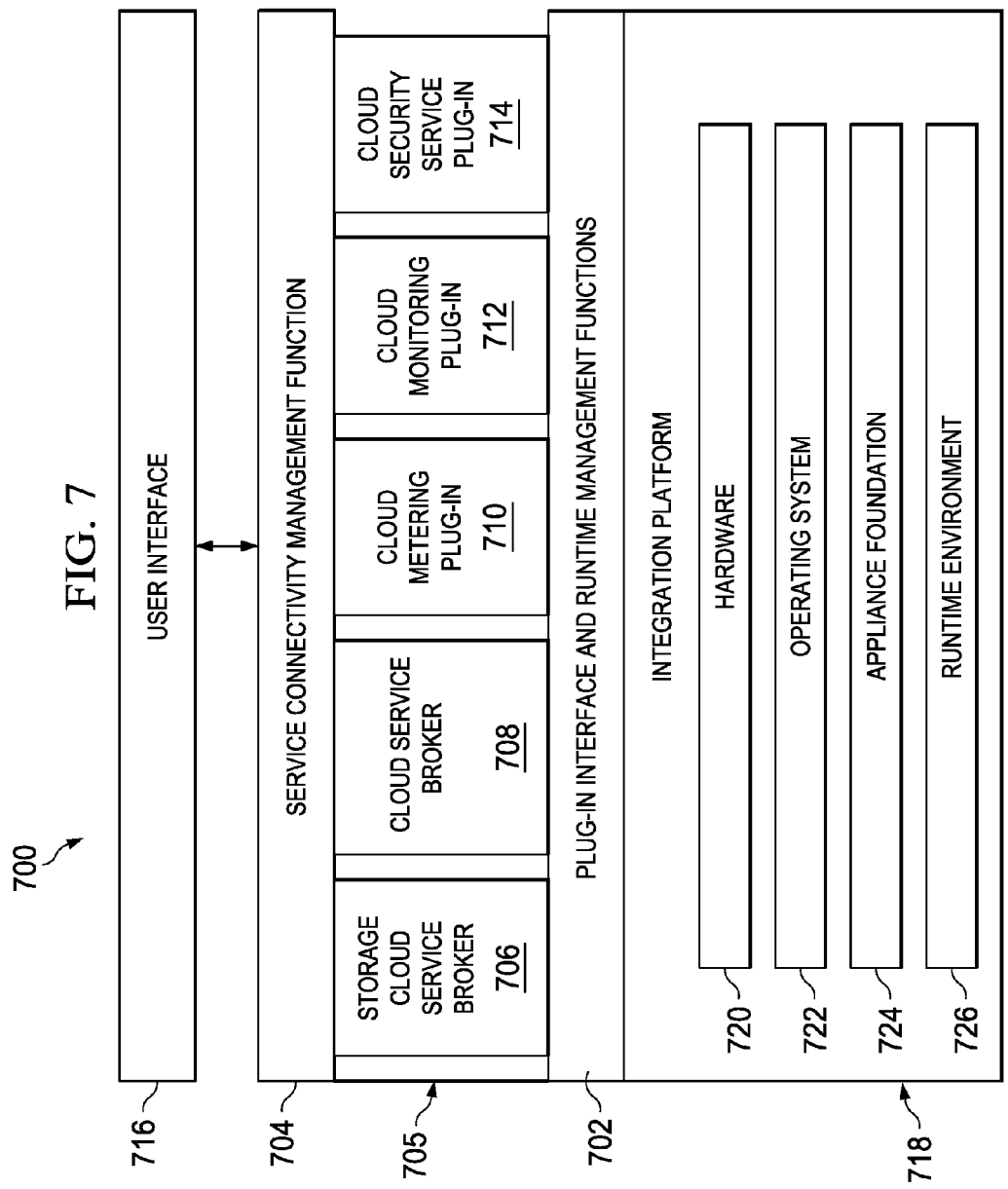
FIG. 7 is a block diagram of a hybrid cloud integrator in accordance with an illustrative embodiment.

Referring now to FIG. 7, a block diagram of a hybrid cloud integrator is depicted in accordance with an illustrative embodiment. In this example, hybrid cloud integrator 700 is an example of one implementation of hybrid cloud integrator 430 of FIG. 4 or hybrid cloud integrator 520 of FIG. 5. Hybrid cloud integrator 700 includes plug-in interface and runtime management functions 702 and service connectivity management function 704. In accordance with an illustrative embodiment, plug-in interface and runtime management functions 702 and service connectivity management function 704 are implemented in software framework 705. A number of plug-ins 706, 708, 710, 712, and 714 may be installed in hybrid cloud integrator 700 and managed during runtime using plug-in interface and runtime management functions 702.

Service connectivity management function 704 provides access to plug-ins 706, 708, 710, 712, and 714 via user interface 716. Service connectivity management function 704 allows an operator to manage the configuration and other parameters of plug-ins 706, 708, 710, 712, and 714 via user interface 716. Service connectivity management function 704 may be used to obtain information about plug-ins 706, 708, 710, 712, and 714, from plug-ins 706, 708, 710, 712, and 714 via user interface 716. For example, service connectivity management function 704 may allow a user to access configuration information and other information from plug-ins 706, 708, 710, 712, and 714 via user interface 716. Service connectivity management function 704 also may be used to provide configuration data and other parameter information to plug-ins 706, 708, 710, 712, and 714 via user interface 716. For example, service connectivity management function 704 allows a user to change configuration and other parameters of plug-ins 706, 708, 710, 712, and 714 via user interface 716. In accordance with an illustrative embodiment, service connectivity management function 704 may employ a common service connectivity management protocol for interaction between plug-ins 706, 708, 710, 712, and 714 and user interface 716. Thus, service connectivity management function 704 provides a common infrastructure for configuring plug-ins 706, 708, 710, 712, and 714.

Plug-in interface and runtime management functions 702 may provide various functions for installing and managing plug-ins 706, 708, 710, 712, and 714 during runtime. For example, plug-in interface and runtime management functions 702 may provide the following function for registering a plug-in as an integration provider in hybrid cloud integrator 700. This function causes the plug-in to be loaded into hybrid cloud integrator 700 and activated.

RegisterIntegrationProvider (ProviderName, LocationUrl), where ProviderName is a unique name for the provider and LocationUrl is the physical location of the provider plug-in.

The following functions may be implemented by selected ones of plug-ins 706, 708, 710, 712, and 714 and called by plug-in interface and runtime management functions 702.

GetIntegrationCapabilities ( ). This function returns one or more integration capabilities supported by a plug-in.
For each integration type

```
{
integration identifier
display name
display summary
display configuration
}.
```

Get metadata for specific capability type. The metadata defines the configuration properties of a specific managed connection type.

GetOnPremiseEndpoints (IntegrationIdentifier). This function returns a list of configuration properties for one or more on-premise endpoints of integration identified by IntegrationIdentifier.
For each on-premise endpoint:

```
{
endpoint identifier
display name
display summary
display description
configuration property[0 ..n]
}.
```

For each configuration property:

```
{
configuration identifier
configuration type (boolean, integer, uint, etc)
required or optional
default value
display name
display summary
display description
}.
```

GetOffPremiseEndpoints (IntegrationIdentifier) This function returns a list of configuration properties for one or more off-premise endpoints of integration identified by IntegrationIdentifier.
For each off-premise endpoint

```
{
endpoint identifier
display name
display summary
display description
configuration property[0 ..n]
}.
```

For each configuration property

```
{
configuration identifier
configuration type (boolean, integer, uint, etc)
required or optional
default value
display name
display summary
display description
}.
```

Add instance of specific capability type. This function creates an instance of managed connection type. This function creates an instance of name InstanceName of an integration of type IntegrationType with the necessary endpoint configurations.

AddIntegration (IntegrationIdentifier, InstanceName, OnPremiseEndpointConfig, OffPremiseEndpointConfig), wherein:

```
OnPremiseEndpointConfig
{
```

-continued

```
    endpoint identifier
    configuration value [0..n]
    }.
    OffPremiseEndpointConfig
    {
    endpoint identifier
    configuration value [0..n]
    }.
    configuration value
    {
    configuration identifier
    configuration value
    }.
```

Delete, start, stop the instance of specific integration type. This function updates an instance of specific capability type. This function is used to modify an instance of managed connection type. See AddIntegration ( . . . ).

DeleteIntegration (IntegrationIdentifier, InstanceName)

Get status of specific capability instance. This function is used to retrieve status data of the managed connection instance for hybrid cloud integration.

Get logs of specific capability instance. This function is used to retrieve log data of a service connectivity management function touchpoint instance.

Unregister plug-in. This function is used to shut down the plug-in and release all instances.

Plug-in interface and runtime management functions 702 in accordance with an illustrative embodiment may provide different functions from those functions listed as examples above.

Plug-ins 706, 708, 710, 712, and 714 may include, for example and without limitation, one or more of storage cloud service broker 706, cloud service broker 708, cloud metering plug-in 710, cloud monitoring plug-in 712, and cloud security service plug-in 714. In this example, storage cloud service broker 706 and cloud service broker 708 are examples of service deployment and integration components 440 in FIG. 4. In this example, cloud metering plug-in 710, cloud monitoring plug-in 712, and cloud security service plug-in 714 are examples of management integration components 442 in FIG. 4.

Hybrid cloud integrator 700 may be implemented on integration platform 718. For example, software framework 705 and plug-ins 706, 708, 710, 712, and 714 may be implemented for operation on integration platform 718. Integration platform 718 comprises hardware 720. Hardware 720 may include data processing system hardware, such as computer hardware. For example, without limitation, hardware 720 may include IBM® WebSphere® Data Power 9004 1U appliance hardware. Operating system 722 runs on hardware 720. For example, without limitation, operating system 722 may include the IBM® MCP 6.0 embedded LINUX® operating system. Operating system 722 supports appliance foundation 724. For example, without limitation, appliance foundation 724 may include the IBM® WebSphere® BEDROCK appliance foundation. Runtime environment 726 is at the highest level of integration platform 718. For example, without limitation, runtime environment 726 may include a JAVA/sMASH runtime environment. In accordance with an illustrative embodiment, integration platform 718 may be implemented using hardware 720, operating system 722, appliance foundation 724, and runtime environment 726 components that are different from the components listed as examples herein.

Figure 8:
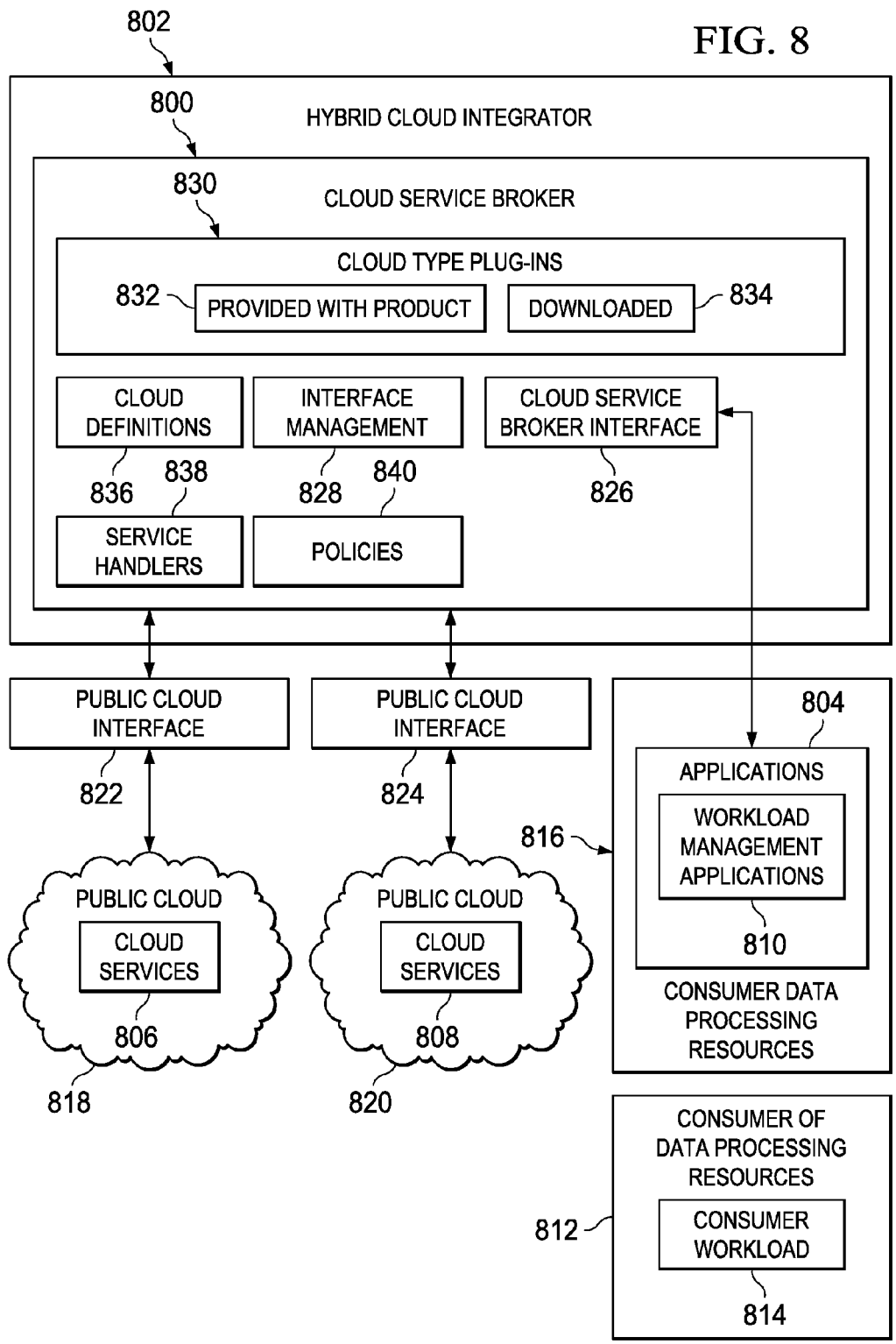
FIG. 8 is a block diagram of a cloud service broker plug-in in accordance with an illustrative embodiment.

A hybrid cloud integrator plug-in, in accordance with an illustrative embodiment, is described in more detail with reference to a specific example. Referring now to FIG. 8, a block diagram of a cloud service broker plug-in is depicted in accordance with an illustrative embodiment. Cloud service broker 800 is an example of a hybrid cloud integrator plug-in in accordance with an illustrative embodiment. In accordance with an illustrative embodiment, cloud service broker 800 is implemented as a plug-in component of hybrid cloud integrator 802. For example, cloud service broker 800 may be deployed in a software framework of hybrid cloud integrator 802, in the manner described above, to provide data processing services, provisioning, and management in a hybrid cloud. Cloud service broker 800 may be configured for a particular application via a user interface associated with hybrid cloud integrator 802. Use of cloud service broker 800, in accordance with an illustrative embodiment, thus centralizes configuration for cloud access.

Cloud service broker 800 may be, for example, an infrastructure as a service cloud service broker. An infrastructure as a service cloud service broker may be used to provision infrastructure as a service cloud services. Alternatively, cloud service broker 800 may be configured to provision and manage other types of cloud services.

In accordance with an illustrative embodiment, cloud service broker 800 may be used by applications 804 to provision cloud services 806 and 808. For example, applications 804 may include workload management applications 810. Workload management applications 810 may be used by consumer of data processing resources 812, for example, to allocate portions of consumer workload 814 for processing by cloud services 806 and 808. Applications 804 may be implemented on consumer data processing resources 816. For example, consumer data processing resources 816 may include a computer network that is owned or controlled by consumer of data processing resources 812 for the exclusive use of consumer of data processing resources 812.

Cloud services 806 and 808 may be data processing resources provided as services by public clouds 818 and 820, respectively. For example, cloud services 806 and 808 may include infrastructure as a service or other data processing resources provided as a service by public clouds 818 and 820. Public clouds 818 and 820 include public cloud interfaces 822 and 824, respectively. Public cloud interfaces 822 and 824 are the interfaces by which consumer of data processing resources 812 provisions and manages cloud services 806 and 808 for use. For example, public cloud interfaces 822 and 824 may include different application programming interfaces that are unique to each of public clouds 818 and 820. Although two public clouds, public clouds 818 and 820, are shown in FIG. 8, cloud service broker 800 may be used to provide cloud service provisioning and management for a single cloud of any type or for more than two clouds of any type.

In accordance with an illustrative embodiment, cloud service broker 800 provides cloud service broker interface 826. Cloud service broker interface 826 provides a single vendor neutral interface for provisioning and managing cloud services 806 and 808 from multiple public clouds 818 and 820. For example, cloud service broker 800 may be made accessible within consumer data processing resources 816 from a published location. Applications 804 and other users wishing to use cloud services 806 or 808 may access such services via cloud service broker interface 826 provided by cloud service broker 800. Applications 804 and other users requesting cloud provisioning or management services via cloud service broker interface 826 need not be aware of cloud specific configurations and public cloud interfaces 822 and 824.

Cloud service broker 800 may provide access to multiple vendor-provided cloud services, such as cloud services 806 and 808 using a centrally managed and administered component. For example, in accordance with an illustrative embodiment, cloud service broker 800 provides interface management 828 for managing public cloud interfaces 822 and 824 to public clouds 818 and 820. Cloud service broker 800 interfaces with individual vendor-provided cloud services, such as cloud services 806 and 808 using the appropriate vendor-specific public cloud interfaces 822 and 824 and associated protocols. In accordance with an illustrative embodiment, cloud service broker 800 manages vendor-specific requirements transparently to the clients of cloud service broker 800, such as applications 804. For example, addition, deletion, and modification in vendor-provided cloud services 806 and 808, protocols, or application programming public cloud interfaces 822 and 824 may be handled by cloud service broker 800 in a manner that is transparent to applications 804 and other users. Thus, applications 804 are shielded from library and application programming interface changes at the cloud level. Applications 804, such as workload management applications 810, only need be aware of cloud service broker interface 826 to use cloud services 806 and 808. Applications 804 need not have details of public cloud interfaces 822 and 824 and other access details.

Cloud service broker 800 may support provisioning and management of cloud services 806 and 808 provided by a number of different cloud types. In accordance with an illustrative embodiment, cloud types supported by cloud service broker 800 may be defined by cloud type plug-ins 830 to cloud service broker 800. Individual cloud type plug-ins 830 may be provided for each different cloud type that is supported by cloud service broker 800. Cloud type plug-ins 830 may define the particular parameters and protocols needed by cloud service broker 800 to provision and manage cloud services 806 and 808 on various different types of clouds. Cloud type plug-ins 830 may come provided with product 832. Cloud type plug-ins 830 that come provided with product 832 are provided along with cloud service broker 800 when cloud service broker 800 is first obtained and installed in hybrid cloud integrator 802. Alternatively, or additionally, cloud type plug-ins 830 may be downloaded 834 and implemented, configured, and activated in cloud service broker 800 at a later time.

Cloud service broker 800 may be used for provisioning and management of cloud services 806 and 808 on specific instances of a cloud type. For example, cloud service broker 800 may be used to provision and manage cloud services 806 and 808 on multiple clouds of a given type or of more than one type. Cloud service broker 800 may maintain cloud definitions 836 for each such cloud instance. Cloud definitions 836 define the details of cloud instances of various cloud types supported by cloud service broker 800. Each such cloud instance is defined by unique attributes that are specified in cloud definitions 836. Cloud instances may be identified in cloud definitions 836 by an identifying cloud name or handle and the associated cloud instance attributes. The cloud name is used as an external key that is used by the system to identify automatically which cloud to address. Cloud attributes may include, for example and without limitation, cloud type, endpoint address, and location data. The cloud type may be identified based on supported application programming interfaces. For example, IBM Compute Cloud and Amazon EC2 Cloud are examples of cloud types. The cloud end-point address may be, for example, a universal resource locator. The cloud location includes cloud type specific location data. These details may be saved by cloud service broker 800 as cloud definitions 836. Applications 804, or other users of cloud service broker 800, may use the name associated with one of cloud service broker 800 cloud definitions 836 to direct workload to cloud services 806 and 808 on the corresponding cloud instance.

Examples of cloud service broker 800 cloud definitions 836 include the following:
   CloudName: IBMCCSBY; CloudType: IBMCC; CloudEndPoint: https://www-180.ibm.com/cloud/enterprise/beta; CloudLocation: 2.
   CloudName: IBMCCRAL; CloudType: IBMCC; CloudEndPoint: https://www-147.ibm.com/cloud/enterprise; CloudLocation: 1.
   CloudName: EC2USEAST; CloudType: AMZEC2; CloudLocation: us-east-1a.

In accordance with an illustrative embodiment, cloud service broker 800 may be used to provision cloud services 806 and 808 for any number of defined cloud types and instances of those cloud types. Cloud service broker 800 also may provide an extensible set of service handlers 838. For example, cloud service broker 800, in accordance with an illustrative embodiment, may provide a framework for handling custom service call parameters, exception handling, and result handling. An abstract class may be used to provide a common framework for all cloud type service implementations. A list of common services in the framework may be extended without the prerequisite of having all cloud type plug-ins 830 updated first. Cloud service broker 800 may default to an exception for any not yet implemented cloud type plug-ins. For example, cloud service broker 800 may default to UnsupportedCloudServiceException for any not yet implemented cloud type plug-ins.

Examples of service handlers 838 that may be supported by cloud service broker 800 may include, without limitation, one or more of the following:

```
listAddresses
listAddress addressed
listImages
listImage imageID
listInstances
listInstances instance ID
make Address
makeImage instanceID imageName <imageDescription>
makeInstance imageID instanceName instanceType <addressID>
restartInstance imageID
deleteAddress addressID
deleteImage imageID
deleteInstance instanceID
registerCloudDefinition CloudName CloudType <CloudEndPoint>
    <CloudLocation>
unregisterCloudDefinition CloudName
```

In accordance with an illustrative embodiment, cloud service broker 800 may provide an administrative control point for enforcement of policies 840. Policies 840 may be defined by consumer of data processing resources 812 or another entity to define limits or conditions for provisioning services by cloud service broker 800. For example, policies 840 may define or limit the cloud types or cloud instances that may be provisioned by cloud service broker 800 or the conditions under which cloud services may be provisioned by cloud service broker 800.

Figure 9:
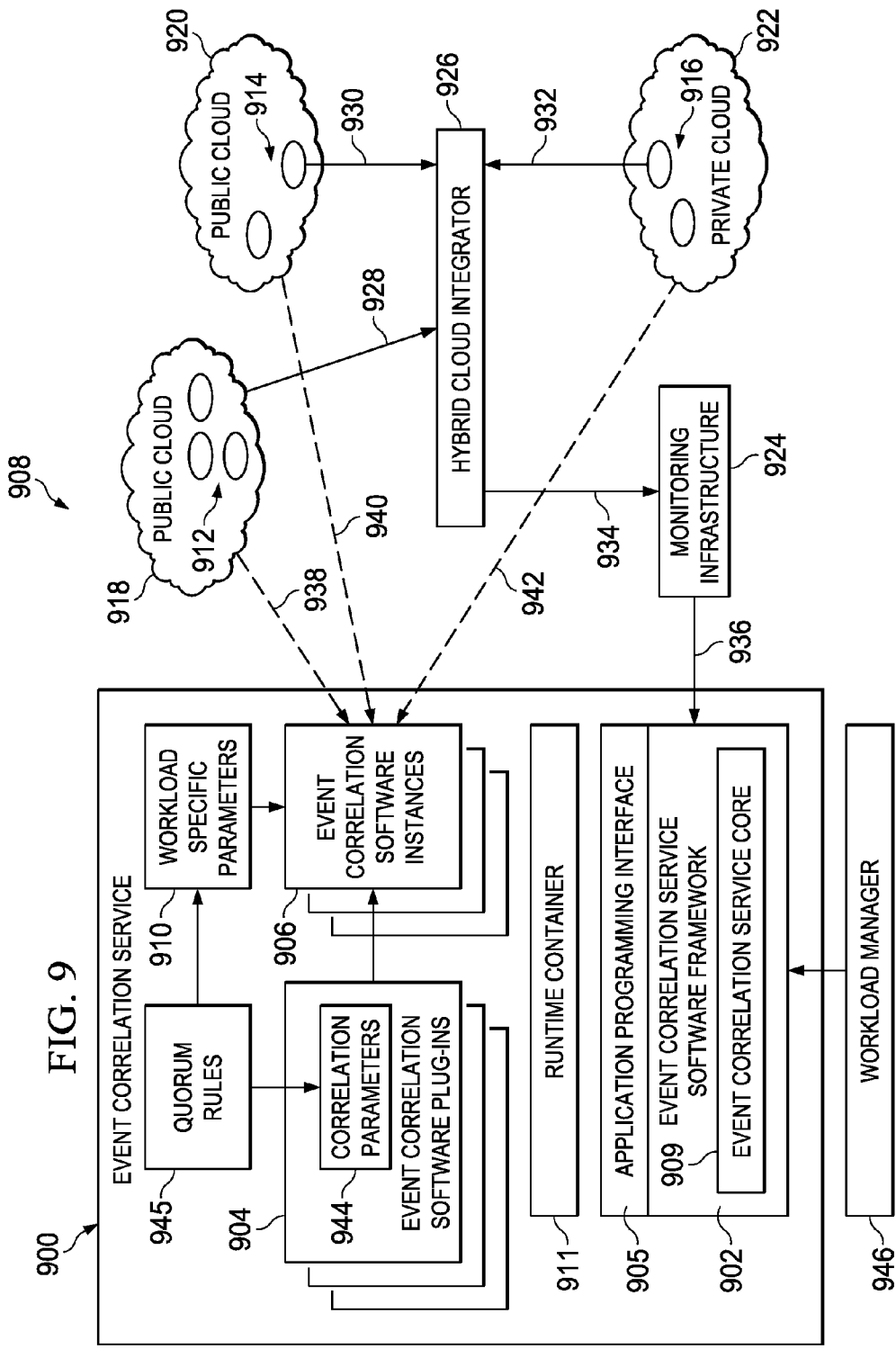
FIG. 9 is a block diagram of an event correlation service in accordance with an illustrative embodiment.

Turning now to FIG. 9, a block diagram of an event correlation service is depicted in accordance with an illustrative embodiment. In this example, event correlation service 900 is an example of one implementation of event correlation and aggregation function 474 in FIG. 4. Event correlation service 900 may be deployed on top of a hybrid cloud monitoring system. For example, event correlation service 900 may be deployed in association with a monitoring infrastructure, such as monitoring infrastructure 468 in FIG. 4. In this case, event correlation service 900 may correlate and aggregate events across a hybrid cloud that are provided to event correlation service 900 by the associated monitoring infrastructure.

In accordance with an illustrative embodiment, event correlation service 900 includes event correlation service software framework 902. Event correlation service software framework 902 may be a modular framework for designing and deploying event correlation software plug-ins 904.

Event correlation service software framework 902 may provide application programming interface 905. Application programming interface 905 may provide for the runtime instantiation of a number of event correlation software instances 906 of event correlation software plug-ins 904. For example, without limitation, one of event correlation software instances 906 may be deployed per workload instance. Alternatively, one of event correlation software instances 906 may perform correlations across multiple workload instances. For example, one of event correlation software instances 906 may perform correlations across multiple workload instances of the same type. Event correlation software instances 906 may be configured for monitoring and correlating workload specific events across hybrid cloud 908. Application programming interface 905 also may be configured to allow a user to specify workload specific parameters 910 for event correlation software instances 906. In accordance with an illustrative embodiment, application programming interface 905 may be common to all event correlation software plug-ins 904 in event correlation service 900. Therefore, parameters for all event correlation software plug-ins 904 in event correlation service 900 may be displayed and configured using the same application programming interface 905.

In accordance with an illustrative embodiment, event correlation software plug-ins 904 may provide functions for monitoring and correlating events of specific types and from specific sources. Event correlation software plug-ins 904 may be key performance indicator specific. Therefore, event correlation software instances 906 of event correlation software plug-ins 904 may be configured to correlate specific types of events aggregated over hybrid cloud 908 processing a workload.

For example, without limitation, hybrid cloud 908 may include data processing services 912 on public cloud 918, data processing services 914 on public cloud 920, and data processing services 916 on private cloud 922. Data processing services 912, 914, and 916 may be configured and operated to process a consumer workload. In this example, events that occur in data processing services 912, 914, and 916 during processing of the consumer workload may be correlated and aggregated by event correlation service 900. In one example, without limitation, event correlation service 900 may be implemented on private cloud 922. In this case, private cloud 922 may be a data center operated by the consumer and may be used to process all or parts of the consumer workload. In other embodiments, event correlation service 900 may be implemented at any other location in hybrid cloud 908 or outside of hybrid cloud 908. For example, without limitation, event correlation service 900 may be offered as a cloud based event correlation service.

Data processing services 912, 914, and 916 may be monitored during processing of the workload by data processing services 912, 914, and 916. Monitored data obtained by monitoring data processing services 912, 914, and 916 during processing of the workload may be aggregated and provided to event correlation service 900. Monitored data from data processing services 912, 914, and 916 may be obtained and reported to event correlation service 900 in any appropriate manner. For example, without limitation, monitored data from data processing services 912, 914, and 916 may be obtained and provided to event correlation service 900 by monitoring infrastructure 924 using hybrid cloud integrator 926 in the manner described elsewhere in this application. The flow of monitored data from data processing services 912, 914, and 916 distributed through hybrid cloud 908 to event correlation service 900 via monitoring infrastructure 924 using hybrid cloud integrator 926 is shown by solid lines 928, 930, 932, 934, and 936 in FIG. 9.

Monitored data from data processing services 912, 914, and 916 may be received by event correlation service software framework 902 in event correlation service 900. Event correlation service software framework 902 then may provide the monitored data to event correlation software instances 906 for processing. From the point of view of event correlation software instances 906, the route of monitored data from data processing services 912, 914, and 916 to event correlation software instances 906 is not important. Therefore, to describe an illustrative embodiment of event correlation service 900 more generically, it may be said simply that monitored data from data processing services 912, 914, and 916 may be provided to event correlation software instances 906 for processing, as shown by dashed lines 938, 940, and 942 in FIG. 9.

In accordance with an illustrative embodiment, event correlation software instances 906 are instances of event correlation software plug-ins 904. Event correlation software plug-ins include correlation parameters 944. Correlation parameters 944 may be plug-in specific, workload specific, or both. Correlation parameters 944 may define, in whole or in part, the event correlation functions that will be performed by event correlation software instances 906 of event correlation software plug-ins 904. The event correlation functions may be defined as functions of data monitored by monitoring infrastructure 924. For example, without limitation, correlation parameters 944 for event correlation software plug-ins 904 may define event correlation functions for specific types of events or events from specific sources. Thus, event correlation software plug-ins 904 may be specialized for specific types of event correlation.

Event correlation service 900 may be used to correlate many different types of events. For example, without limitation, event correlation service 900 may be used to correlate an event of aggregate average resource utilization by a workload exceeding or falling below specified thresholds. Different types of resources may be of importance to workloads. Therefore, the thresholds may be defined in terms of various data processing resource characteristics. For example, some workloads may be sensitive to available CPU cycles. Other workloads may be sensitive to memory or disk capacity or other data processing resource characteristics. Some workloads may have more complex thresholds, such as maximum or minimum resource utilization, average response time, throughput, or other thresholds or combinations of thresholds. In accordance with an illustrative embodiment, an application, workload, or information technology administrator may respond to different types of key performance indicators by using event correlation service 900 to define events accordingly.

To correlate events for a specific workload being processed in hybrid cloud 908, event correlation software instances 906 are created from selected event correlation software plug-ins 904 for the specific types of event correlation to be performed. Event correlation software instances 906 inherit correlation parameters 944 from event correlation software plug-ins 904 from which they are created. Event correlation software instances 906 also may be provided workload specific parameters 910. Workload specific parameters 910 may modify the event correlation functions defined by event correlation software plug-ins 904 for a specific workload. Monitored data from data processing services 912, 914, and 916 processing the workload is processed by event correlation software instances 906, using correlation parameters 944 inherited from event correlation software plug-ins 904 and workload specific parameters 910, to identify events of interest that occur in hybrid cloud 908 during processing of the workload.

For example, without limitation, processing of monitored data from data processing services 912, 914, and 916 by event correlation service software instances 906 may include correlating the monitored data from data processing services 912, 914, and 916 that are processing a workload in hybrid cloud 908 to provide correlated data. Event correlation service software instances 906 then may determine whether the correlated data exceeds a threshold. The occurrence of an event of interest may be identified in response to a determination that the correlated data exceeds the threshold. The data to be correlated, methods of correlation, and thresholds employed by event correlation software instances 906 may be defined by correlation parameters 944, workload specific parameters 910, or both.

A hierarchy of event correlation software instances 906 may be used to define and correlate complex events for monitoring complex workloads in hybrid cloud 908. For example, the results of event correlation by a number of correlation software instances 906 may be provided via event correlation service software framework 902 to other correlation software instances 906 for further processing. Thus, events may be further aggregated and correlated across multiple correlation software instances 906 to derive and correlate higher level complex events of interest.

Event correlation software instances 906 may employ quorum rules 945 for processing data from data processing services 912, 914, and 916. Quorum rules 945 may be provided as correlation parameters 944 in event correlation software plug-ins 904. Alternatively, or additionally, quorum rules 945 may be provided as workload specific parameters 910. Furthermore, quorum rules 945 may be managed dynamically. For example, without limitation, quorum rules 945 may be managed dynamically by workload manager 946 using application programming interface 905 provided by event correlation service software framework 902.

Quorum rules 945 define an event horizon over which events of interest are aggregated. Quorum rules 945 may define a quorum number of data processing services from which relevant monitored data must be received in a defined time period before the data is processed by event correlation software instances 906 to identify the occurrence of events of interest. The quorum number of data processing services may be less than the total number of data processing services that are processing a workload in hybrid cloud 908. For example, due to the fact that data processing services 912, 914, and 916 processing a workload may be distributed throughout hybrid cloud 908, it is possible that data from one or more of data processing resources 912, 914, and 916 that may be used by event correlation software instances 906 to identify events may be delayed or lost. However, quorum rules 945 may specify that if relevant data is received from at least the quorum number of data processing resources 912, 914, and 916 within the defined time period, then event correlation software instances 906 may proceed to process the data that was received to identify events of interest occurring during processing of the workload.

An output may be provided, directly or indirectly, to workload manager 946, or to another device, system, or process, for events of interest that are identified by event correlation service 900. For example, without limitation, an output for events of interest that are identified by event correlation service 900 may be provided from event correlation software instances 906 to workload manager 946 via event correlation service software framework 902. Workload manager 946 then may respond proactively or reactively to the events of interest in an appropriate manner. For example, without limitation, actions that workload manager 946 may take or initiate in response to the occurrence of events of interest may include accessing other types of data processing services, triggering alerts, starting or stopping data processing services, or other appropriate actions or combinations of actions.

Workload manager 946, or another user, may select the event correlation software instances 906 that are to be created to provide event correlation for a specific workload being processed in hybrid cloud 908. For example, using application programming interface 905 provided by event correlation service software framework 902, workload manager 946 or another user may select event correlation software plug-ins 904 and workload specific parameters 910 for creating event correlation software instances 906 to perform the desired event correlation for the specific workload.

In some cases, workload manager 946 or another user may determine that event correlation software plug-ins 904 for providing a desired type of event correlation may not be registered with event correlation service software framework 902. In this case, workload manager 946 or another user may use application programming interface 905 provided by event correlation service software framework 902 to load and register event correlation software plug-ins 904 for providing the desired type of event correlations with event correlation service software framework 902. Event correlation software instances 906 then may be created from the newly loaded and registered event correlation service software plug-ins 904.

Data processing services 912, 914, and 916 provisioned in hybrid cloud 908 to process a workload may change dynamically. For example, data processing services 912, 914, and 916 may be stopped, started, added as new resources, and/or may perform different types of functions as workload manager 946 redistributes workload processing among available data processing resources in hybrid cloud 908. In accordance with an illustrative embodiment, event correlation service 900 is capable of adapting to such dynamic changes in the composition of data processing services 912, 914, and 916 processing a workload. For example, workload manager 946 may use application programming interface 905 provided by event correlation service software framework 902 to start, stop, and/or change event correlation software instances 906 as necessary in response to any change in the composition of data processing resources 912, 914, and 916 processing a workload.

Event correlation service software framework 902 may comprise event correlation service core 909. For example, without limitation, in one embodiment, event correlation software plug-ins 904 may be a Java Class or an archived collection of classes (jar) where at least one class implements plug-in interface PluginIntf. PluginIntf extends Runnable and adds a single method:
  public void selfConfigure (Properties conf, String name, String alias), where conf contains the content of an event correlation service properties file, name is the name of the plug-in type, and alias is the name of the instance of the plug-in type. Together, name and alias uniquely identify the plug-in.

Event correlation service core 909 may periodically check the event correlation service properties file. When a new plug-in instance of a specific plug-in type (i.e., class) is detected and its "enable" property is true, the event correlation service core 909 may instantiate the plug-in class with the properties from the event correlation service properties file pertaining to this plug-in instance, identified by alias, using the selfConfigure method of the plug-in interface. A direct call to the event correlation service core 909 may force it to immediately instantiate a new plug-in. Event correlation software plug-ins 904 may be disabled by setting an "enable" property to false.

Event correlation service 900 may be implemented using runtime container 901. For example, without limitation, runtime container 901 may be implemented using IBM Netcool/ Impact runtime container.

Figure 10:
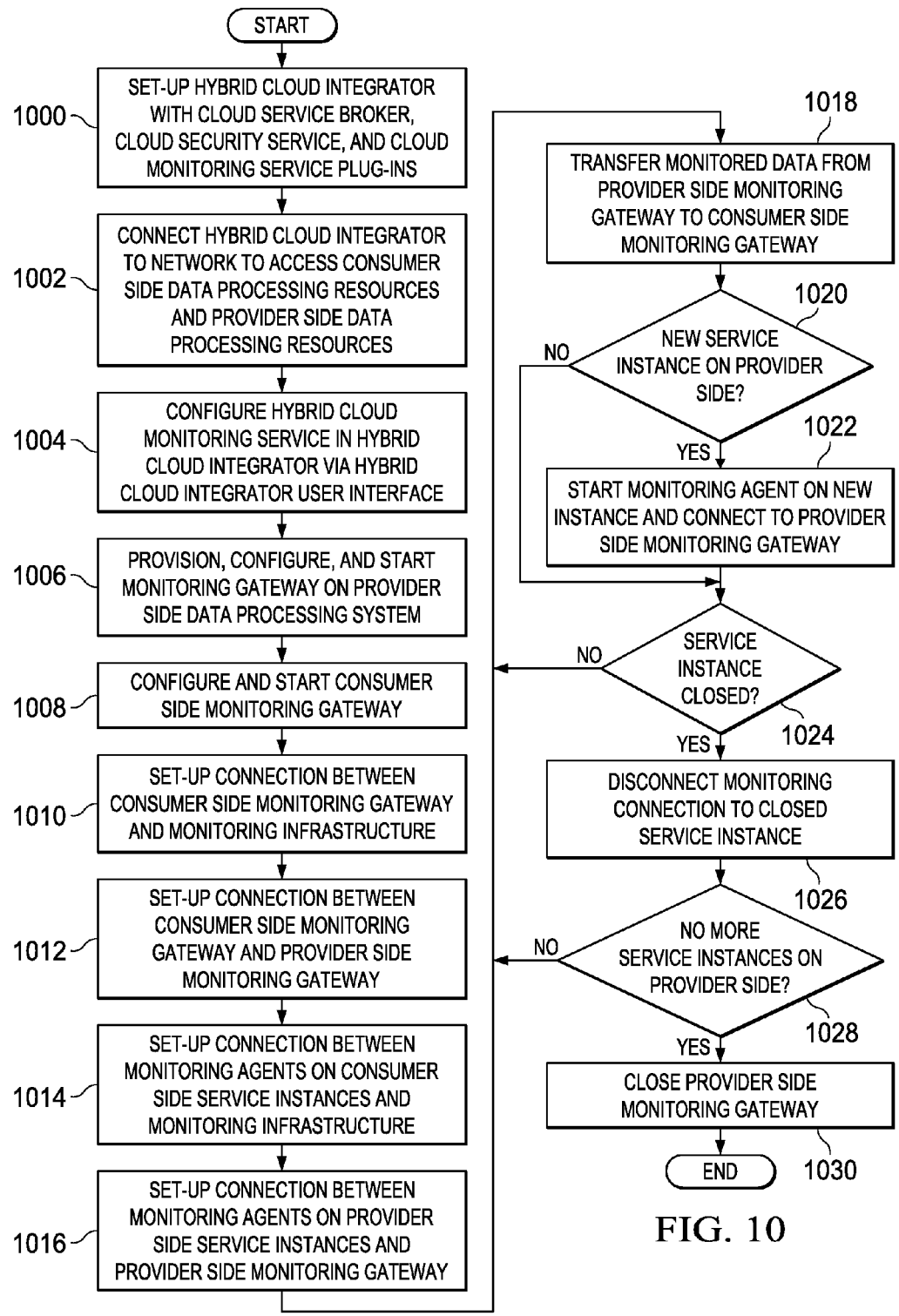
FIG. 10 is a flowchart of a process for hybrid cloud monitoring in accordance with an illustrative embodiment.

Referring now to FIG. 10, a flowchart of a process for hybrid cloud monitoring is depicted in accordance with an illustrative embodiment. The method illustrated in FIG. 10 may be implemented, for example, in data processing environment 400 and using hybrid cloud integrator 430 in FIG. 4 or in data processing environment 500 and using hybrid cloud integrator 520 in FIG. 5. The process illustrated in FIG. 10 may be used to provide monitoring of data processing resources in a hybrid cloud environment. For example, the process illustrated in FIG. 10 may be used to obtain data from a number of data processing services processing a workload in a hybrid cloud for use by an event correlation service, such as event correlation service 900 in FIG. 9. In this example, the hybrid cloud integrator is assumed to be implemented on a consumer side of the hybrid cloud. For example, the hybrid cloud integrator may be implemented in a physical server or in a virtual server deployed in the on-premise consumer data processing resources on the consumer side of the hybrid cloud.

Hybrid cloud monitoring, in accordance with an illustrative embodiment, may begin with setting up a hybrid cloud integrator with a cloud service broker, cloud security service, and cloud monitoring service plug-ins (step 1000). For example, step 1000 may include loading the appropriate plug-ins into the hybrid cloud integrator framework. In other cases, one or more of the appropriate plug-ins already may be in place in the hybrid cloud integrator.

The hybrid cloud integrator then may be connected to the network so it can access consumer side data processing resources as well as provider side data processing resources (step 1002). The network access may be from inside the consumer network infrastructure and the access to provider side resources may be restricted because of firewalls and proxy servers at the boundary of the consumer side network and external networks including the network where the provider side resources are located.

The hybrid cloud monitoring service in the hybrid cloud integrator then may be configured via the hybrid cloud integrator user interface (step 1004). For example, step 1004 may include configuring the cloud monitoring service on the hybrid cloud integrator as a provider of monitoring data for cloud provided services to a monitoring infrastructure. The monitoring infrastructure may be implemented on the consumer side of the hybrid cloud. Step 1004 may include using the hybrid cloud integrator user interface to configure the cloud monitoring service as a new consumer side provider to the monitoring infrastructure. For example, this configuration step may include, without limitation, providing a name, description, and role for the cloud monitoring service acting as a provider to the monitoring infrastructure. Parameters to be provided as part of the configuration step may include, without limitation, identification of the host server for the monitoring infrastructure, identification of a port for communicating with the monitoring infrastructure, identification of an address for the consumer side monitoring gateway that will communicate with the monitoring infrastructure, and identification of a protocol for communication between the consumer side monitoring gateway and the monitoring infrastructure.

Step 1004 also may include configuring the cloud monitoring service on the hybrid cloud integrator by identifying the service or services to be monitored on the provider side of the hybrid cloud. This step may include creating a new provider side service participant to be monitored. For example, this step may include, without limitation, identifying a name, description, and role of the cloud service to be monitored. Parameters to be provided at this part of the configuration may include, without limitation, an end-point address and location for the cloud service to be monitored. For example, without limitation, the end-point address may be provided as a universal resource locater address for the cloud service to be monitored.

A provider side monitoring gateway then is established and a provider side monitoring agent is set up, configured, and started (step 1006). The provider side monitoring gateway may be provided on the provider side of a firewall that separates the provider side from the consumer side of a hybrid cloud. For example, the provider side of the hybrid cloud may be provided on a public cloud. Step 1006 may be implemented using the services of the cloud service broker and the cloud security service. In one example, step 1006 may include automated instantiation and configuration of the provider side monitoring gateway using the services of the cloud service broker. In another example, step 1006 may include setting up an existing provider side monitoring gateway for use with the provider side monitoring agent. Step 1006 may include receiving via the hybrid cloud integrator a user selection indicating the process to be used to establish the provider side monitoring gateway. Step 1006 may include providing configuration parameters for the provider side monitoring gateway to the hybrid cloud integrator via the hybrid cloud integrator user interface. Such configuration parameters may include, without limitation, identification of a monitoring gateway image to be used to establish the provider side monitoring gateway and an address for the provider side monitoring gateway. For example, without limitation, the address for the provider side monitoring gateway may be provided as an internet protocol address. In any case, the provider side monitoring agent may monitor processing on the provider side of the hybrid cloud and provide resulting monitored data to the provider side monitoring gateway.

A consumer side monitoring gateway is configured and started on the consumer side of the hybrid cloud (step 1008). For example, step 1008 may include implementing the consumer side monitoring gateway by a cloud monitoring service plug-in to the hybrid cloud integrator. The consumer side monitoring gateway provides the source of provider side monitoring information to a monitoring infrastructure for monitoring resources on the provider side of the hybrid cloud. Step 1008 may include configuring the consumer side monitoring gateway to communicate with the monitoring infrastructure.

A connection between the consumer side monitoring gateway and the monitoring infrastructure is then set-up (step 1010). The monitoring infrastructure may be implemented in the consumer side data processing system. Thus, the monitoring infrastructure may be on the same side of the firewall as the consumer side monitoring gateway. The monitoring infrastructure may be implemented using a number of commercially available products for monitoring the operation of data processing resources. In another embodiment, cloud based monitoring services may be used instead of a physical monitoring infrastructure.

A connection between the consumer side monitoring gateway and the provider side monitoring gateway is then set-up (step 1012). The connection between the consumer side monitoring gateway and the provider side monitoring gateway may be established as a secure connection through the firewall that separates the consumer side from the provider side of the hybrid cloud.

Connections between monitoring agents on consumer side service instances and the monitoring infrastructure are set-up (step 1014). The consumer side monitoring agents provide monitoring information related to operation of the consumer side service instances to the monitoring infrastructure. The consumer side monitoring agents may be on the same side of the firewall as the monitoring infrastructure. Therefore, the consumer side monitoring agents may be set-up to push monitoring information to the monitoring infrastructure as such information is detected or generated by the consumer side monitoring agents.

Connections between monitoring agents on provider side service instances and the provider side monitoring gateway are set-up (step 1016). The provider side monitoring agents provide monitoring information related to operation of the provider side service instances to the provider side monitoring gateway. For example, a monitoring agent may be installed and configured for each of several public cloud service instances to be monitored. Each public cloud side monitoring agent may be configured to monitor desired operating conditions of a public cloud service instance. Each public cloud side monitoring agent is configured to provide monitoring information to the provider side monitoring gateway. The provider side monitoring gateway is configured to receive the monitoring information from the public cloud side monitoring agents. Provisioning resources for the public cloud side monitoring agents and installing and configuring the monitoring agents may be performed remotely using appropriate service deployment component and management integration component plug-ins in a hybrid cloud integrator in accordance with an illustrative embodiment.

Monitored data, received from the provider side monitoring agents by the provider side gateway, is transferred from the provider side monitoring gateway to the consumer side monitoring gateway (step 1018). Step 1018 may include transferring data through the firewall separating the consumer side from the provider side of the hybrid cloud. Therefore, for security reasons, step 1018 may be implemented by pulling data from the provider side monitoring gateway for transfer to the consumer side monitoring gateway. The provider side monitoring gateway may not be allowed to push data through the firewall to the consumer side of the hybrid cloud. Security of the consumer's data processing resources is maintained in this process since no data is pushed across the firewall from the provider side of the hybrid cloud.

The monitoring information pulled from the provider side gateway may be provided to the monitoring infrastructure via the consumer side gateway. From the point of view of the monitoring infrastructure, the consumer side gateway provides monitoring information in the same manner as a consumer side monitoring agent for monitoring data processing resources on the consumer side of the hybrid cloud. With monitoring information for consumer side data processing resources provided by the consumer side monitoring agents and monitoring information for provider side data processing resources provided by the consumer side gateway, a monitoring infrastructure is able to monitor simultaneously the operation of data processing resources on both sides of a hybrid cloud.

It may be determined that a new service instance to be monitored has been established on the provider side of the hybrid cloud (step 1020). In response to determining that a new service instance has been established, a provider side monitoring agent may be started on the new instance and connected to the provider side monitoring gateway (step 1022). Step 1022 may include provisioning for the new monitoring agent on the provider side of the hybrid cloud and installing and configuring the new monitoring agent on the provider side of the hybrid cloud using the appropriate hybrid cloud integrator plug-ins. Step 1022 also may include configuring the provider side monitoring gateway to receive monitoring information from the new provider side monitoring agent. For example, step 1022 may include using the cloud security service plug-in in the hybrid cloud integrator to implement security policies that allow for communication between the new provider side monitoring agent and the provider side monitoring gateway. Security policies that allow for communication between the new provider side monitoring agent and the provider side monitoring gateway may be implemented, for example, by adding the new provider side monitoring agent to an appropriate security zone that also includes the provider side monitoring gateway. The new provider side monitoring agent then may monitor the operation of the new service instance and provide monitoring information to the provider side monitoring gateway for transfer to the monitoring infrastructure via the consumer side monitoring gateway as described above.

It also may be determined that a service instance that was being monitored has been closed or otherwise will not be monitored for some reason (step 1024). In response to determining that monitoring of a service instance is to be stopped, the monitoring connection to the closed service instance is disconnected (step 1026). If the closed service instance is on the consumer side of the hybrid cloud, step 1026 may include disconnecting the connection between a monitoring agent on the consumer side service instance and the monitoring infrastructure. If the closed service instance is on the provider side of the hybrid cloud, step 1026 may include closing the connection between the provider side monitoring gateway and the provider side monitoring agent for the closed instance. Closing the connection between the provider side monitoring gateway and the provider side monitoring agent for the closed instance may include configuring the provider side monitoring gateway to no longer receive information from the monitoring agent for the closed instance. For example, step 1026 may include using the cloud security service plug-in in the hybrid cloud integrator to implement security policies that prevent further communication between a provider side monitoring agent and the provider side monitoring gateway. Security policies that prevent communication between the provider side monitoring agent and the provider side monitoring gateway may be implemented, for example, by removing the provider side monitoring agent for the closed instance from the security zone that also includes the provider side monitoring gateway. Step 1026 also may include closing the monitoring agent that is no longer needed. Closing the monitoring agent that is no longer needed allows data processing resources that were being used for the closed monitoring agent to be released.

After closing a service instance on the provider side of a hybrid cloud, it may be determined that there are no more service instances running on the provider side or otherwise that are to be monitored (step 1028). In response to determining that there are no longer any provider side service instances to be monitored, the provider side monitoring gateway may be closed (step 1028), with the process terminating thereafter. Closing the provider side monitoring gateway when there are no longer any provider services to be monitored allows the provider services that were being used for the provider side gateway to be released.

Returning now to step 1020, in response to determining that a new service instance has not been established, the process proceeds to step 1024 to determine that a service instance that was being monitored has been closed or otherwise will not be monitored for some reason. In response to determining that monitoring of a service instance is not to be stopped, the process iterates back to step 1018 and monitored data is transferred from the provider side monitoring gateway to the consumer side monitoring gateway.

Returning now to step 1028, in response to determining that there are provider side service instances to be monitored, the process iterates back to step 1018 and monitored data is transferred from the provider side monitoring gateway to the consumer side monitoring gateway.

In some cases, it may not be desirable to close the provider side monitoring gateway and release the corresponding provider data processing resources immediately when it is determined that there are no remaining provider side service instances to be monitored. For example, in some cases, it may be expected that monitoring of provider side services will be restarted after only a short intermission. In these cases, it may be preferred to keep the provider side gateway in place but inactive even when there are no provider side service instances to be monitored. This allows the provider side monitoring gateway to be restarted quickly when new provider side service instances to be monitored are started. If the provider side monitoring gateway was closed and the corresponding provider side resources released, resources would need to be re-provisioned for the provider side monitoring gateway on the provider side of the hybrid cloud and the provider side monitoring gateway reinstalled and configured when new provider side service instances to be monitored are started. This process of provisioning, installing, and configuring a new provider side monitoring gateway would take much longer than restarting a temporarily deactivated gateway.

Figure 11:
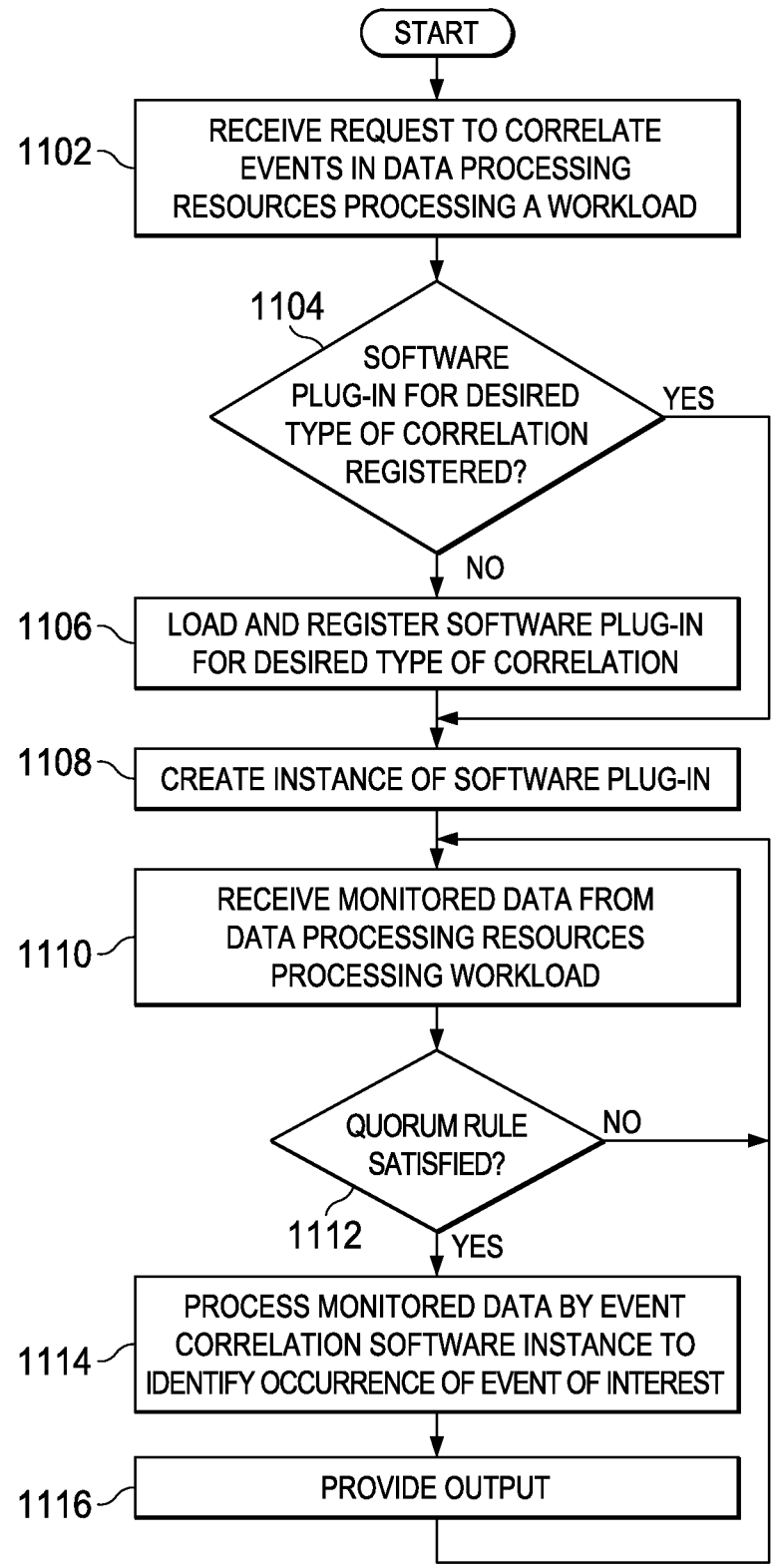
FIG. 11 is a flowchart of a process for correlating events in data processing resources processing a workload in accordance with an illustrative embodiment.

Turning now to FIG. 11, a flowchart of a process for correlating events in data processing resources processing a workload is depicted in accordance with an illustrative embodiment. For example, the process depicted in FIG. 11 may be implemented in event correlation service 900 in FIG. 9 for correlating events occurring during processing of a workload by data processing services distributed through a hybrid cloud.

The process may begin by receiving a request to correlate events in data processing resources processing a workload (operation 1102). Operation 1102 may include receiving a request from a workload manager or other user to correlate events occurring during processing of a workload by data processing services distributed through a hybrid cloud. It then may be determined whether a software plug-in for the desired type of event correlation to be performed is registered in the event correlation service (operation 1104). If a software plug-in for the desired type of event correlation to be performed is not registered in the event correlation service, a software plug-in for the desired type of event correlation to be performed may be loaded and registered (operation 1106).

After loading and registering a software plug-in for the desired type of event correlation to be performed, or if it is determined at operation 1104 that a software plug-in for the desired type of event correlation to be performed is already registered in the event correlation service, an instance of the software plug-in may be created (operation 1108). The event correlation software instance inherits correlation parameters for the desired type of event correlation from the software plug-in. The event correlation software instance also may be created to include workload specific event correlation parameters. Monitored data is then received by the event correlation software instance from the data processing resources processing the workload (operation 1110). For example, operation 1110 may include receiving the monitored data from data processing resources distributed in a hybrid cloud via a monitoring infrastructure using a hybrid cloud integrator, as described elsewhere herein. If quorum rules are used by the event correlation software instance, it may be determined whether the quorum rules are satisfied (operation 1112). For example, the quorum rules may be satisfied if the appropriate data is received from at least a quorum number of data processing resources in the hybrid cloud within a defined time period. If the quorum rules are not satisfied, the process may return to operation 1110 and the event correlation software instance may continue to receive monitored data from the data processing resources in the hybrid cloud until the quorum rules are satisfied.

If the quorum rules are satisfied, the monitored data may be processed by the event correlation software instance to identify the occurrence of an event of interest (operation 1114). The correlation parameters inherited from the software plug-in and any workload specific parameters may be used by the event correlation software instance for processing of the monitored data to identify an event of interest. For example, without limitation, operation 1114 may include correlating monitored data from a plurality of data processing resources processing a workload to provide correlated data, determining whether the correlated data exceeds a threshold, and identifying the occurrence of an event of interest in response to a determination that the correlated data exceeds the threshold. An output may be provided in response to identifying the occurrence of an event of interest (operation 1116). For example, operation 1116 may include providing the output to a workload manager or other user so that an appropriate action may be taken. The process may then continue with repeating operations 1110, 1112, 1114, and 1116 as long as event correlation for the workload continues to be desired.

Figure 12B:
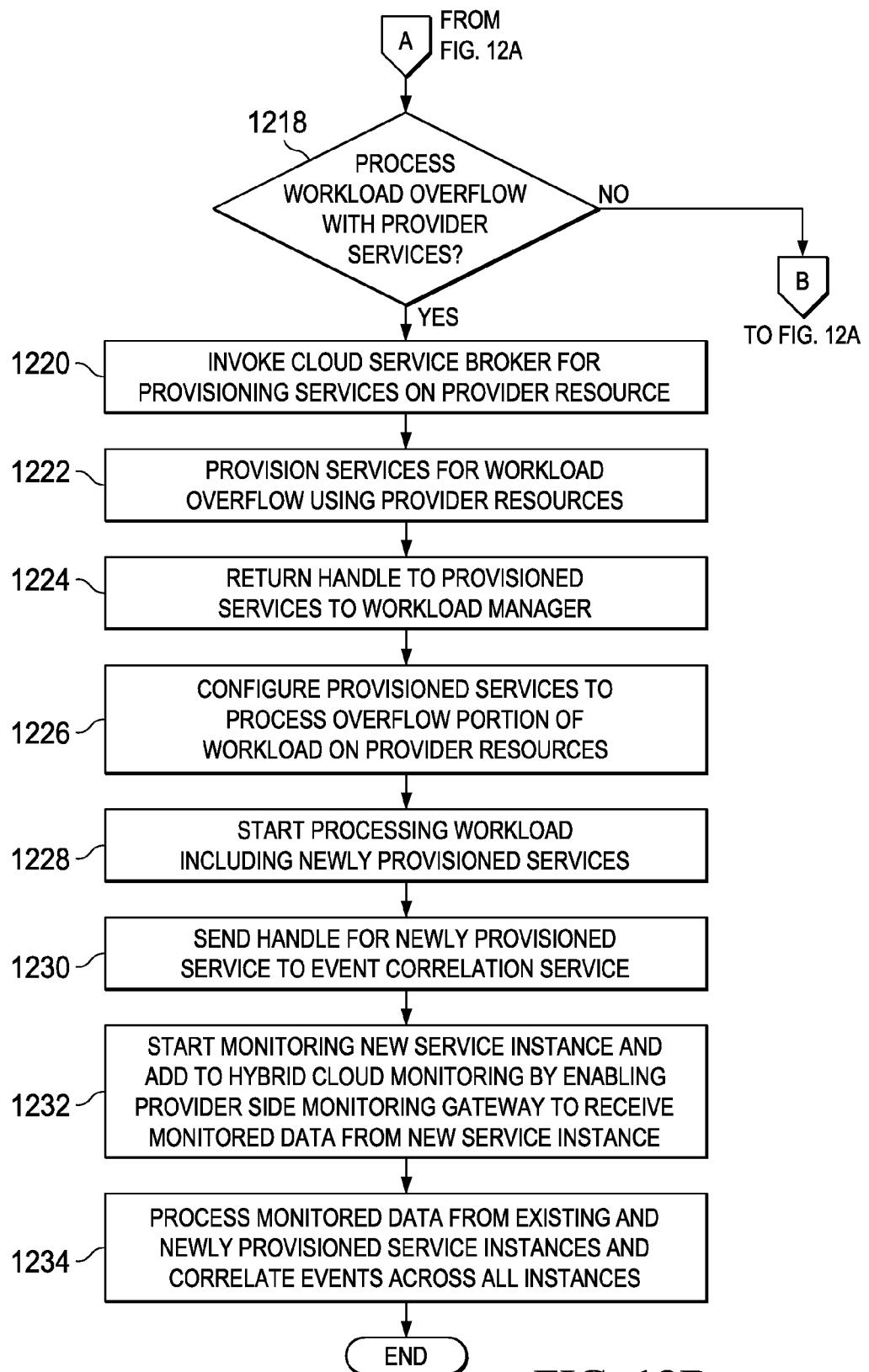

Turning now to FIGS. 12A-12B, flowcharts of a process for workload overflow management are depicted in accordance with an illustrative embodiment. For example, without limitation, the process of FIGS. 12A-12B may be implemented in data processing environment 400 using hybrid cloud integrator 430 in FIG. 4 and using event correlation service 900 in FIG. 9. The process illustrated in FIGS. 12A-12B is an example of workload overflow management, in accordance with an illustrative embodiment, in which a consumer workload may be processed in part on a consumer side of a hybrid cloud and in part on a provider side of the hybrid cloud.

Managing workload overflow, in accordance with an illustrative embodiment, may begin with setting up a hybrid cloud integrator with a cloud service broker and monitoring plug-ins (operation 1200). The cloud service broker plug-in may be configured and set up for integrating provisioning services on a consumer data processing system with provisioning services on the provider side of a hybrid cloud (operation 1202). The monitoring plug-in may be set up and configured to establish hybrid cloud monitoring across data processing services on the provider side and on a consumer side of the hybrid cloud (operation 1204). Step 1204 may be implemented, for example, using the method illustrated in FIG. 10.

An event correlation service may be set up and configured (operation 1206). The event correlation service aggregates and correlates monitored data from the consumer data processing resources and services and the provider data processing resources and services that are processing the consumer workload. The event correlation service may be set-up and configured for aggregating and correlating events that are specific to the workloads being processed. For example, operation 1206 may include instantiating one or more instances of a number of event correlation software plug-ins in the event correlation service. Instantiation of the various event correlation software instances may be accomplished via an application programming interface provided by an event correlation service software framework.

One or more workload overflow thresholds may be defined (operation 1208). The workload overflow thresholds may be defined based on a number of policies for operating a hybrid cloud to process the consumer workload. The workload overflow thresholds may be defined by workload specific parameters for a number of the event correlation software instances instantiated in operation 1206. For example, operation 1208 may include defining workload specific parameters for the number of event correlation software instances via the application programming interface provided by the event correlation service software framework.

A workload manager then may be set up and configured, and processing of the workload may be started (operation 1210). The workload manager may initialize workload processing by provisioning and configuring sufficient resources and services on the consumer side of a hybrid cloud to meet the consumer's workload demand. In accordance with an illustrative embodiment, the workload manager also may use the services and resources on the provider side of the hybrid cloud for workload processing. The distribution of the consumer's workload between the consumer side and the provider side of a hybrid cloud may be defined by a number of policies. The workload manager keeps track of the various portions of the consumer workload that are being processed on the consumer's data processing resources and on provider data processing resources. Operation 1210 may include making the workload manager aware that the event correlation service is correlating and aggregating monitored events from across the hybrid cloud as the workload is being processed.

Monitoring of the workload and correlation of detected events is started (operation 1211). As a workload is processed on the consumer's data processing resources, and perhaps also on provider data processing resources, the event correlation service may continuously aggregate and correlate detected events across multiple monitored resources. For example, such event correlation and aggregation may be provided by the number of event correlation software instances in the event correlation service.

Based on event aggregation and correlation by the event correlation service, it may be determined that a workload overflow threshold has been exceeded (operation 1212). For example, operation 1212 may be performed by an event correlation software instance in the event correlation service using a workload overload threshold defined by the workload specific parameters for the event correlation software instance. In response to a determination that the workload overflow threshold has been exceeded, a service request may be sent to the workload manager (operation 1214). The service request may provide information on the overflow situation including an indication of the severity or urgency of the situation or an expected trend. This information may be provided by the event correlation service based on an evaluation of detected events. For example, the service request may be generated by the event correlation software instance detecting the overflow condition. The workload manager may receive the service request and send an acknowledgment (operation 1216). For example, upon receiving the service request, the workload manager may send a response to the event correlation service to indicate that the service request has been received.

The workload manager then may process the service request, apply policies, and determine the appropriate action to take in response to the overflow condition (operation 1217). Information technology administrators, business decision makers, and others responsible for managing the workload and business processes may set and change specific policies from time to time to best satisfy the needs of the business or other consumer of data processing resources. Based on the policies applied to the determined overflow condition, the workload manager may determine that the appropriate response to the overflow condition is to process the workload overflow with provider services on the provider side of a hybrid cloud (operation 1218).

If it is decided at operation 1218 to process the workload overflow with provider services, the workload manager may invoke the cloud service broker plug-in in the hybrid cloud integrator for provisioning the required services on the provider resources (operation 1220). Workload specific services may need to be provisioned and configured and appropriate data made available for processing a portion of the consumer workload using provider data processing resources. Operation 1220 may be performed using the cloud service broker application programming interface. The cloud service broker plug-in then may provision the required services for the workload overflow using the provider resources (operation 1222). Operation 1222 may include invoking by the cloud service broker the provider's service provisioning specific application programming interface to provision the desired service on the provider side of the hybrid cloud on behalf of the workload manager. When the appropriate service is provisioned, a handle to the provisioned service on the provider data processing resources may be made available to the cloud service broker. The cloud service broker may return the handle to the provisioned services to the workload manager (operation 1224). The handle allows the workload manager to make use of the provisioned resources for workload processing. For example, if the service provisioned by the cloud service broker is an infrastructure as a service, a virtual machine instance may be created from a specified image and provisioned with the requested amount of processing units, random access memory, and disk capacity. The virtual machine instance may be assigned an instance identity number and a network address. Access to the service may be granted to a workload specific user. The cloud service broker passes this information to the workload manager.

The provisioned services may be configured to process an overflow portion of the consumer's workload on the provider resources (operation 1226). Operation 1226 may be performed by the workload manager and may include, for example, initializing the service by providing specific workload parameters, providing access credentials, setting up secure connectivity between the consumer's data processing resources, services, and data sources and the newly provisioned service on the provider data processing resources, and making portions of the consumer's workload available for processing by the newly provisioned service. After configuring the provisioned services, processing of the workload including the newly provisioned services may be started (operation 1228). For example, the effect of operations 1220 through 1228 may be to shift processing of a portion of the consumer's workload from consumer data processing resources on the consumer side of a hybrid cloud to provider data processing resources on the provider side of the hybrid cloud in response to detecting an overflow condition on the consumer's data processing resources.

The workload manager may inform the event correlation service of the new topology for processing the workload, including the new service instance. For example, a handle for the newly provisioned service may be sent to the event correlation service (operation 1230). The handle allows the event correlation service to monitor workload processing on the newly provisioned service. The handle may provide information, such as the service identity associated with the newly provisioned service, so that the event correlation service can include that service as it aggregates monitored data and correlates events across the hybrid cloud. The workload manager may send the handle to the event correlation service as part of, or along with, a service fulfillment response indicating that the service request from the event correlation service has been processed and fulfilled.

Monitoring of the new service instance may be started and added to monitoring of the hybrid cloud by enabling a provider side monitoring gateway to receive monitored data from the new service instance (operation 1232). Establishing monitoring of a new service instance on the provider side of a hybrid cloud is described in more detail above with reference to FIG. 10. Monitored data from existing service instances and from the newly provisioned service instances may then be processed and events correlated across all service instances processing the consumer's workload (operation 1234) with the process terminating thereafter. Operation 1234 may include monitoring data and correlating events across service instances on both the consumer side and the provider side of a hybrid cloud.

Returning to operation 1212, in response to determining that a workload overflow threshold has not been exceeded, the process may continue determining whether a workload overflow threshold has been exceeded until a determination is made.

Returning to operation 1218, if a determination has been made not to process the workload overflow with provider services, the process may return to operation 1211 to continue monitoring the workload and correlating the detected events.

Figure 13B:
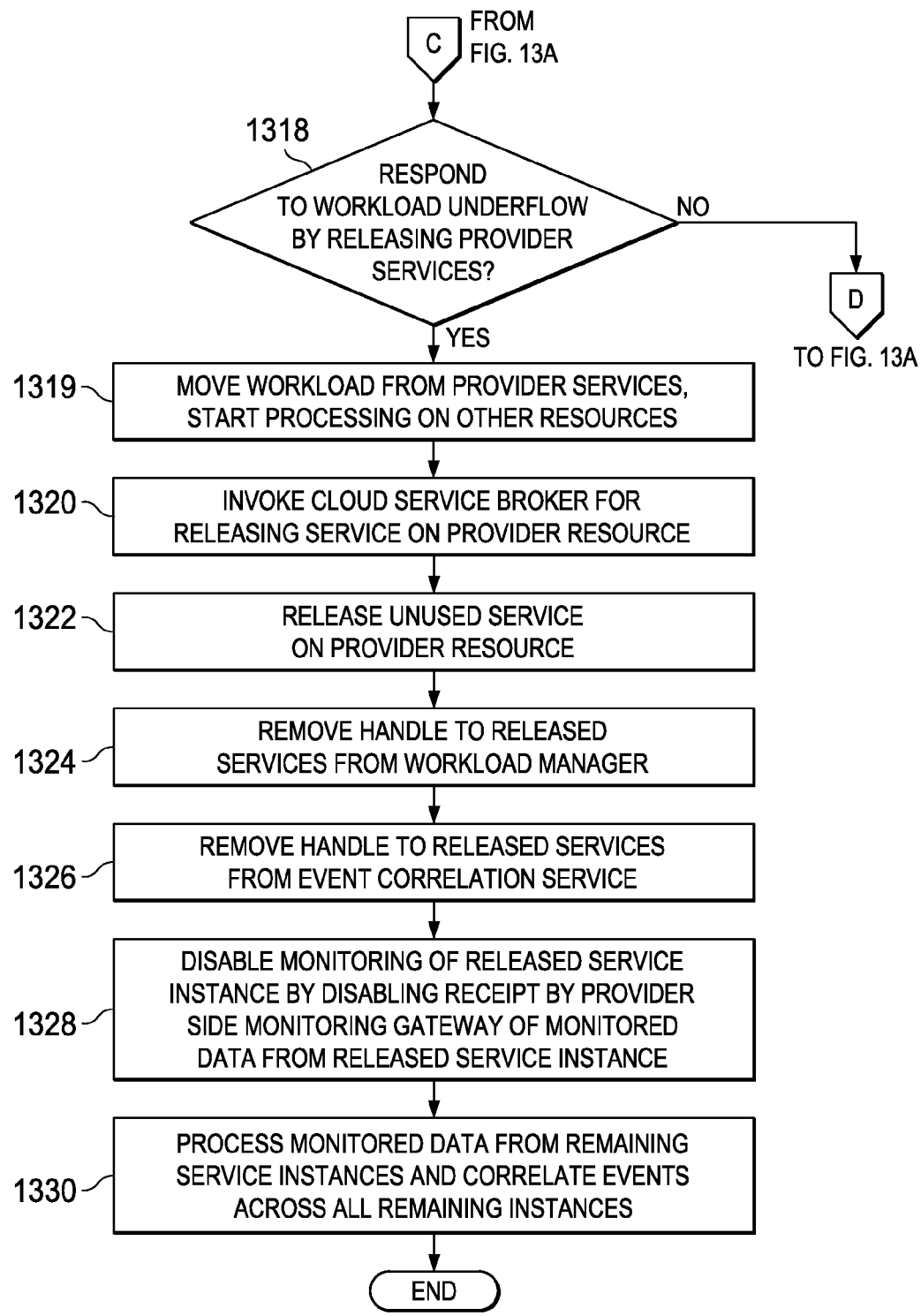

Turning now to FIGS. 13A-13B, flowcharts of a process for workload underflow management are depicted in accordance with an illustrative embodiment. The process of FIGS. 13A-13B may be implemented, for example, in data processing environment 400 using hybrid cloud integrator 430 in FIG. 4 and event correlation service 900 in FIG. 9. The process in FIGS. 13A-13B is an example of workload underflow management, in accordance with an illustrative embodiment, in which a consumer workload may be processed in part on a consumer side of a hybrid cloud and in part on a provider side of the hybrid cloud.

Managing workload underflow, in accordance with an illustrative embodiment, may begin with setting up a hybrid cloud integrator with cloud service broker and monitoring plug-ins, as described above (operation 1300). The cloud service broker plug-in may be configured and set up for integrating with provider services on the provider side of a hybrid cloud (operation 1302). The monitoring plug-in may be set up and configured to establish hybrid cloud monitoring across data processing services on the provider side and on a consumer side of the hybrid cloud (operation 1304). Operation 1304 may be implemented, for example, using the process illustrated in FIG. 10.

An event correlation service may be set up and configured (operation 1306). The event correlation service aggregates and correlates monitored data from the consumer data processing resources and services and the provider data processing resources and services that are processing the consumer workload. The event correlation service may be set-up and configured for aggregating and correlating events that are specific to the workloads being processed. For example, operation 1306 may include instantiating one or more instances of a number of event correlation software plug-ins in the event correlation service. Instantiation of the various event correlation software instances may be accomplished via an application programming interface provided by an event correlation service software framework.

One or more workload underflow thresholds may be defined (operation 1308). The workload underflow thresholds may be defined based on a number of policies for operating a hybrid cloud to process the consumer workload. The workload underflow thresholds may be defined by workload specific parameters for a number of the event correlation software instances instantiated in operation 1306. For example, operation 1308 may include defining workload specific parameters for the number of event correlation software instances via the application programming interface provided by the event correlation service software framework.

A workload manager may then be set up and configured and processing of the workload may be started (operation 1310). The workload manager may initialize workload processing by provisioning and configuring sufficient resources and services on the consumer side of a hybrid cloud to meet the consumer's workload demand. In accordance with an illustrative embodiment, the workload manager also may use the services and resources on the provider side of the hybrid cloud for workload processing. The distribution of the consumer's workload between the consumer side and the provider side of a hybrid cloud may be defined by a number of policies. The workload manager keeps track of the various portions of the consumer workload that are being processed on the consumer's data processing resources and on provider data processing resources. Operation 1310 may include making the workload manager aware that the event correlation service is correlating and aggregating monitored events from across the hybrid cloud as the workload is being processed.

Monitoring of the workload and correlation of detected events is started (operation 1311). As a workload is processed on the consumer's data processing resources, and perhaps also on provider data processing resources, the event correlation service may continuously aggregate and correlate detected events across multiple monitored resources. For example, such event correlation and aggregation may be provided by the number of event correlation software instances in the event correlation service.

Based on event aggregation and correlation by the event correlation service, it may be determined that a workload underflow threshold has been reached (operation 1312). For example, operation 1312 may be performed by an event correlation software instance in the event correlation service using a workload underflow threshold defined by workload specific parameters. In response to the determination that a workload underflow threshold has been reached, a service request may be sent to the workload manager (operation

1314). The service request may provide information on the underflow situation, including an indication of the degree of severity of the situation or an expected trend. This information may be provided by the event correlation service based on an evaluation of detected events. For example, the service request may be generated by the event correlation service software instance detecting the underflow condition. The workload manager may receive the service request and send an acknowledgment (operation 1316). For example, upon receiving the service request, the workload manager may send a response to the event correlation service to indicate that the service request has been received.

The workload manager may then process the service request, apply policies, and determine the appropriate action to take in response to the underflow condition based on the applied policies (operation 1317). Information technology administrators, business decision makers, and others responsible for managing the workload and business processes may set and change specific policies from time to time to best satisfy the needs of the business or other consumer of data processing resources. Based on the policies applied to the determined underflow condition, the workload manager may determine that the appropriate response to the underflow condition is to release provider services on the provider side of a hybrid cloud (operation 1318). Releasing of resources may be possible because the determination of an underflow condition indicates that at least some resources in the hybrid cloud may not be fully utilized. Releasing unneeded provider resources may eliminate ongoing costs associated with provider data processing services. In response to a determination that the appropriate response to the underflow condition is to release provider services, the workload manager may move processing of a portion of the workload from the provider resources to be released and start processing more of the workload on other resources (operation 1319). For example, operation 1319 may include moving processing of a portion of the consumer workload from the provider resources to be released to currently underutilized data processing resources on the consumer side of the hybrid cloud.

The workload manager may invoke the cloud service broker plug-in in the hybrid cloud integrator for releasing a number of services on the provider resources (operation 1320). Operation 1320 may be performed using the cloud service broker application programming interface. The cloud service broker plug-in may then release the unused services on the provider resources resulting from the workload underflow condition (operation 1322). Operation 1322 may include the cloud service broker invoking the provider's service provisioning specific application programming interface to release the desired service on the provider side of the hybrid cloud on behalf of the workload manager.

When a provider side service is released, the handle to the released service on the provider data processing resources may be removed from the workload manager (operation 1324). For example, the cloud service broker may send a notification to the workload manager indicating the release of the specific service on the provider side of the hybrid cloud. In turn, the workload manager may send a service fulfillment response to the event correlation service indicating completion of the transaction that was initiated by the event correlation service with the notification of the underflow condition. Removing the handle from the workload manager prevents the workload manager from attempting to use the released service for processing of the consumer workload.

The workload manager may inform the event correlation service of the new topology for processing the workload. For example, a handle for the newly released service also may be removed from the event correlation service (operation 1326). Removing the handle from the event correlation service prevents the event correlation service from attempting to detect events in the released service. Detecting events in a released service instance may be disabled by disabling the receiving of monitored data from the released service instance by a provider side monitoring gateway (operation 1328). Stopping monitoring of a service instance on the provider side of a hybrid cloud is described in more detail above with reference to FIG. 10. Monitored data from remaining service instances across the hybrid cloud may continue to be processed and events correlated across all service instances processing the consumer's workload (operation 1330) with the process terminating thereafter. Operation 1330 may include monitoring data and correlating events across service instances on both the consumer side and the provider side of a hybrid cloud.

Hybrid cloud integration in accordance with an illustrative embodiment provides a well defined method and apparatus for integrating on-premise infrastructure, platform, applications, and data with off-premise cloud based infrastructure, platform, services, and data. A hybrid cloud integrator in accordance with an illustrative embodiment provides a structured framework of interfaces for hybrid cloud service configuration and deployment of service plug-ins. Using these interfaces and application programming interfaces, hybrid cloud service plug-ins may be defined, configured, and deployed to create integrated hybrid cloud services.

Hybrid cloud integration in accordance with an illustrative embodiment may be used to provide integration capabilities across a hybrid cloud comprising any combination of data processing resources. In one example, described in detail herein, a hybrid cloud integrator in accordance with an illustrative embodiment may be used to provide integration across a hybrid cloud comprising a consumer's private cloud and a provider's pubic cloud. However, hybrid cloud integration in accordance with an illustrative embodiment may be used to provide integration capabilities for various other types of hybrid clouds. For example, a hybrid cloud integrator in accordance with an illustrative embodiment may be used to provide integration across a hybrid cloud comprising multiple private clouds. As another example, a hybrid cloud integrator in accordance with an illustrative embodiment may be used to provide integration across a hybrid cloud comprising multiple public clouds.

Each line of business within a single enterprise may have its own data processing resources implemented as a private cloud. Each such private cloud may have its own point-of-delivery and point-of-control. Multiple private clouds of this type may be integrated into a single hybrid cloud and made available to a consumer of data processing resources within the enterprise. A hybrid cloud integrator in accordance with an illustrative embodiment may be used to provide integration across such a hybrid cloud. A hybrid cloud formed by integrating private cloud services across multiple private clouds using a hybrid cloud integrator in accordance with an illustrative embodiment allows a consumer of resources of one private cloud to consume, from the consumer's point-of-delivery, resources and services made available on another private cloud. The hybrid cloud integrator may be configured to allow administrators of each private cloud to manage their clouds from their respective points-of-control. Hybrid cloud integrator plug-in services in accordance with an illustrative embodiment may be configured to allow the consumer of data processing resources to enforce the same security, monitoring, and governance requirements on the consumer's data processing operations performed across the hybrid cloud, wherever the consumer's workload is being processed. Thus, using a hybrid cloud integrator in accordance with an illustrative embodiment, workload management may be achieved in a hybrid cloud formed across multiple private clouds.

As another example, hybrid cloud integration in accordance with an illustrative embodiment may be used to integrate across a hybrid cloud between two or more public clouds. In this case, use of a hybrid cloud integrator in accordance with an illustrative embodiment allows a consumer of data processing resources of one public cloud to perform and control consumer data processing operations by coordinating and consuming resources and services from multiple public clouds using a single point-of-delivery and point-of-control. Plug-in components in the hybrid cloud integrator may be configured to allow the consumer to enforce the same security, monitoring, and governance requirements on the consumer's data processing operations performed across the hybrid cloud, wherever the consumer's workload is being processed. Thus, using a hybrid cloud integrator in accordance with an illustrative embodiment, workload management may be achieved in a hybrid cloud formed across multiple public clouds.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or to limit the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for correlating events in data processing resources processing a workload, comprising:

starting, by one or more processors, a provider side monitoring gateway on a provider side data processing system in a first cloud, wherein the provider side monitoring gateway is located on a provider side of a firewall that separates the provider side from a consumer side of a hybrid cloud, and wherein the provider side monitoring gateway collects provider side monitored data from a provider processing monitoring agent associated with provider data processing resources;

starting, by the one or more processors, a consumer side monitoring gateway on a consumer side data processing system in a second cloud, wherein the consumer side monitoring gateway is located on the consumer side of the firewall that separates the provider side from the consumer side of the hybrid cloud, and wherein the consumer side monitoring gateway provides the provider side monitored data from the provider side monitoring gateway to a consumer side monitoring infrastructure within the consumer side data processing system, and wherein the consumer side monitoring gateway collects consumer side monitored data from a consumer processing monitoring agent associated with consumer data processing resources;

establishing, by the one or more processors, a secure connection through the firewall between the provider side monitoring gateway associated with the provider data processing resources and the consumer side monitoring gateway associated with the consumer data processing resources, wherein the secure connection through the firewall enables the consumer side monitoring gateway to pull the provider side monitored data corresponding to the provider processing resources from the provider side monitoring gateway and prevents the provider side monitoring gateway to push data through the firewall into the consumer side monitoring gateway to maintain security of the consumer data processing resources;

pulling, by the one or more processors, the provider side monitored data from the provider side monitoring gateway into the consumer side monitoring gateway using the secure connection;

pushing, by the one or more processors, the provider side monitored data pulled into the consumer side monitoring gateway and the consumer side monitored data to the consumer side monitoring infrastructure;

detecting, by the one or more processors, an occurrence of an event that defines a pattern over a specified time period in the provider side monitored data associated with the provider side processing resources in the first cloud and the consumer side monitored data associated with the consumer side processing resources in the second cloud using the consumer side monitoring infrastructure of the consumer side processing resources;

sending, by the one or more processors, the event as input to an event correlation and aggregation function that aggregates and correlates received events over periods of time;

determining, by the one or more processors, that a series of received events has occurred indicating the consumer side processing resources and the provider side processing resources are in an overload or underutilization condition using the event correlation and aggregation function;

responsive to the one or more processors determining that the series of received events has occurred, generating, by the one or more processors, an event based service request to modify a resource configuration of the hybrid cloud using a service desk ticketing function;

sending, by the one or more processors, the event based service request to a workload manager that accesses the consumer side processing resources and the provider side processing resources to modify the resource configuration of the hybrid cloud to respond to the overload or underutilization condition; and generating, by the one or more processors, a service fulfillment response to the event based service request using the workload manager and sending the service fulfillment response to the service desk ticketing function.

2. The method of claim 1 further comprising:

configuring, by the one or more processors, the consumer side monitoring infrastructure to collect the monitored data for the workload;

collecting, by the one or more processors, the monitored data for the workload by the consumer side monitoring infrastructure as the workload is being processed; and providing, by the one or more processors, the monitored data from the consumer side monitoring infrastructure to the event correlation and aggregation function as the workload is being processed.

3. The method of claim 1, wherein configuring the event correlation and aggregation function comprises:

creating, by the one or more processors, an event correlation software instance from an event correlation software plug-in, wherein the event correlation software plug-in is a software plug-in to an event correlation service software framework, and wherein the event correlation software instance inherits from the event correlation software plug-in first correlation parameters used for correlating the events in processing the workload; and receiving, by the one or more processors, second correlation parameters for the event correlation software instance, wherein the second correlation parameters comprise workload specific parameters used for correlating the events in processing the workload;

and wherein processing the monitored data comprises:

using, by the one or more processors, the event correlation software instance to identify the occurrence of the event that defines the pattern over the specified time period from the monitored data using the first correlation parameters and the second correlation parameters.

4. The method of claim 3, wherein configuring the event correlation and aggregation function further comprises:

receiving, by the one or more processors, a request to correlate the events in processing the workload;

responsive to receiving the request, determining, by the one or more processors, whether the event correlation software plug-in is registered with the event correlation service software framework; and responsive to a determination that the event correlation software plug-in is not registered with the event correlation service software framework, using, by the one or more processors, an application programming interface of the event correlation service software framework to load and register the event correlation software plug-in.

5. The method of claim 4, wherein the one or more processors receive the request from the workload manager and further comprising:

sending, by the one or more processors, an output to the workload manager.

6. The method of claim 1, wherein processing the monitored data comprises:

correlating, by the one or more processors, the monitored data from a plurality of data processing resources processing the workload to provide correlated data;

determining, by the one or more processors, whether the correlated data exceeds a threshold; and identifying, by the one or more processors, the occurrence of the event that defines the pattern over the specified time period in response to a determination that the correlated data exceeds the threshold.

7. The method of claim 1, wherein processing the monitored data comprises:

correlating, by the one or more processors, the monitored data from a number of a plurality of data processing resources processing the workload to provide correlated data;

determining, by the one or more processors, whether the number of the plurality of data processing resources meets or exceeds a quorum number, wherein the quorum number is less than a total number of the plurality of data processing resources processing the workload; and processing, by the one or more processors, the correlated data to identify the occurrence of the event that defines the pattern over the specified time period in response to a determination that the number of the plurality of data processing resources meets or exceeds the quorum number.

8. The method of claim 1, wherein the hybrid cloud is selected from a group of hybrid clouds consisting of:

a first hybrid cloud wherein the provider side processing resources are provided as a service on a public cloud and the consumer side processing resources are provided on a private cloud;

a second hybrid cloud wherein the provider side processing resources are provided as a service on the private cloud and the consumer side processing resources are provided on another private cloud; and a third hybrid cloud wherein the provider side processing resources are provided as the service on a public cloud and the consumer side processing resources are provided on another public cloud.

9. A computer program product for correlating events in data processing resources processing a workload, the computer program product comprising a non-transitory computer readable storage medium having program instructions embodied therewith, the program instructions executable by one or more processors to cause the one or more processors to:

start, by the one or more processors, a provider side monitoring gateway on a provider side data processing system in a first cloud, wherein the provider side monitoring gateway is located on a provider side of a firewall that separates the provider side from a consumer side of a hybrid cloud, and wherein the provider side monitoring gateway collects provider side monitored data from a provider processing monitoring agent associated with provider data processing resources;

start, by the one or more processors, a consumer side monitoring gateway on a consumer side data processing system in a second cloud, wherein the consumer side monitoring gateway is located on the consumer side of the firewall that separates the provider side from the consumer side of the hybrid cloud, and wherein the consumer side monitoring gateway provides the provider side monitored data from the provider side monitoring gateway to a consumer side monitoring infrastructure within the consumer side data processing system, and wherein the consumer side monitoring gateway collects consumer side monitored data from a consumer processing monitoring agent associated with consumer data processing resources;

establish, by the one or more processors, a secure connection through the firewall between the provider side monitoring gateway associated with the provider data processing resources and the consumer side monitoring gateway associated with the consumer data processing resources, wherein the secure connection through the firewall enables the consumer side monitoring gateway to pull the provider side monitored data corresponding to the provider processing resources from the provider side monitoring gateway and prevents the provider side monitoring gateway to push data through the firewall into the consumer side monitoring gateway to maintain security of the consumer data processing resources;

pull, by the one or more processors, the provider side monitored data from the provider side monitoring gateway into the consumer side monitoring gateway using the secure connection;

push, by the one or more processors, the provider side monitored data pulled into the consumer side monitoring gateway and the consumer side monitored data to the consumer side monitoring infrastructure;

detect, by the one or more processors, an occurrence of an event that defines a pattern over a specified time period in provider side monitored data associated with provider side processing resources in a first cloud and consumer side monitored data associated with consumer side processing resources in a second cloud using a consumer side monitoring infrastructure of the consumer side processing resources, wherein the first cloud and the second cloud comprise a hybrid cloud;

send, by the one or more processors, the event as input to an event correlation and aggregation function that aggregates and correlates received events over periods of time;

determine, by the one or more processors, that a series of received events has occurred indicating the consumer side processing resources and the provider side processing resources are in an overload or underutilization condition using the event correlation and aggregation function;

generate, by the one or more processors, an event based service request to modify a resource configuration of the hybrid cloud using a service desk ticketing function in response to determining that the series of received events has occurred;

send, by the one or more processors, the event based service request to a workload manager that accesses the consumer side processing resources and the provider side processing resources to modify the resource configuration of the hybrid cloud to respond to the overload or underutilization condition; and generate, by the one or more processors, a service fulfillment response to the event based service request using the workload manager and send the service fulfillment response to the service desk ticketing function.

10. The computer program product of claim 9, wherein the one or more processors further execute the program instructions to configure the event correlation and aggregation function comprising:

create, by the one or more processors, an event correlation software instance from an event correlation software plug-in, wherein the event correlation software plug-in is a software plug-in to an event correlation service software framework, and wherein the event correlation software instance inherits from the event correlation software plug-in first correlation parameters used for correlating the events in processing the workload; and receive, by the one or more processors, second correlation parameters for the event correlation software instance, wherein the second correlation parameters comprise workload specific parameters used for correlating the events in processing the workload;

and wherein the one or more processors further execute the program instructions to process the monitored data comprising:

use, by the one or more processors, the event correlation software instance to identify the occurrence of the event that defines the pattern over the specified time period from the monitored data using the first correlation parameters and the second correlation parameters.

11. The computer program product of claim 10, further comprising:

receive, by the one or more processors, a request to correlate events in processing the workload;

determine, by the one or more processors, whether the event correlation software plug-in is registered with the event correlation service software framework in response to receiving the request; and load and register, by the one or more processors, the event correlation software plug-in with the event correlation service software framework in response to a determination that the event correlation software plug-in is not registered with the event correlation service software framework.

12. The computer program product of claim 11, further comprising:

receive, by the one or more processors, the request from the workload manager; and send, by the one or more processors, an output to the workload manager.

13. The computer program product of claim 9, further comprising:

correlate, by the one or more processors, the monitored data from a plurality of data processing resources processing the workload to provide correlated data;

determine, by the one or more processors, whether the correlated data exceeds a threshold; and identify, by the one or more processors, the occurrence of the event that defines the pattern over the specified time period in response to a determination that the correlated data exceeds the threshold.

14. The computer program product of claim 9, further comprising:

correlate, by the one or more processors, the monitored data from a number of a plurality of data processing resources processing the workload to provide correlated data;

determine, by the one or more processors, whether a number of plurality of data processing resources meets or exceeds a quorum number, wherein the quorum number is less than a total number of the plurality of data processing resources processing the workload; and process, by the one or more processors, the correlated data to identify the occurrence of the event that defines the pattern over the specified time period in response to a determination that the number of the plurality of data processing resources meets or exceeds the quorum number.

15. The computer program product of claim 9, wherein the hybrid cloud is selected from a group of hybrid clouds consisting of:

a first hybrid cloud wherein the provider side processing resources are provided as a service on a public cloud and the consumer side processing resources are provided on a private cloud;

a second hybrid cloud wherein the provider side processing resources are provided as a service on the private cloud and the consumer side processing resources are provided on another private cloud; and a third hybrid cloud wherein the provider side processing resources are provided as the service on a public cloud and the consumer side processing resources are provided on another public cloud.

16. A data processing system for correlating events in data processing resources processing a workload, the data processing system comprising:

a bus system;

a storage device connected to the bus system, wherein the storage device stores program instructions; and one or more processors connected to the bus system, wherein the one or more processors execute the program instructions to:

start a provider side monitoring gateway on a provider side data processing system in a first cloud, wherein the provider side monitoring gateway is located on a provider side of a firewall that separates the provider side from a consumer side of a hybrid cloud, and wherein the provider side monitoring gateway collects provider side monitored data from a provider processing monitoring agent associated with provider data processing resources;

start a consumer side monitoring gateway on a consumer side data processing system in a second cloud, wherein the consumer side monitoring gateway is located on the consumer side of the firewall that separates the provider side from the consumer side of the hybrid cloud, and wherein the consumer side monitoring gateway provides the provider side monitored data from the provider side monitoring gateway to a consumer side monitoring infrastructure within the consumer side data processing system, and wherein the consumer side monitoring gateway collects consumer side monitored data from a consumer processing monitoring agent associated with consumer data processing resources;

establish a secure connection through the firewall between the provider side monitoring gateway associated with the provider data processing resources and the consumer side monitoring gateway associated with the consumer data processing resources, wherein the secure connection through the firewall enables the consumer side monitoring gateway to pull the provider side monitored data corresponding to the provider processing resources from the provider side monitoring gateway and prevents the provider side monitoring gateway to push data through the firewall into the consumer side monitoring gateway to maintain security of the consumer data processing resources;

pull the provider side monitored data from the provider side monitoring gateway into the consumer side monitoring gateway using the secure connection;

push the provider side monitored data pulled into the consumer side monitoring gateway and the consumer side monitored data to the consumer side monitoring infrastructure;

detect an occurrence of an event that defines a pattern over a specified time period in provider side monitored data associated with provider side processing resources in a first cloud and consumer side monitored data associated with consumer side processing resources in a second cloud using a consumer side monitoring infrastructure of the consumer side processing resources, wherein the first cloud and the second cloud comprise a hybrid cloud;

send the event as input to an event correlation and aggregation function that aggregates and correlates received events over periods of time;

determine that a series of received events has occurred indicating the consumer side processing resources and the provider side processing resources are in an overload or underutilization condition using the event correlation and aggregation function;

generate an event based service request to modify a resource configuration of the hybrid cloud using a service desk ticketing function in response to determining that the series of received events has occurred;

send the event based service request to a workload manager that accesses the consumer side processing resources and the provider side processing resources to modify the resource configuration of the hybrid cloud to respond to the overload or underutilization condition; and generate a service fulfillment response to the event based service request using the workload manager and send the service fulfillment response to the service desk ticketing function.

17. The data processing system of claim 16, wherein the one or more processors further execute the program instructions to:

receive a request to correlate the events in processing the workload;

determine whether an event correlation software plug-in is registered with an event correlation service software framework in response to receiving the request; and use an application programming interface of the event correlation service software framework to load and register the event correlation software plug-in in response to a determination that the event correlation software plug-in is not registered with the event correlation service software framework.

18. The data processing system of claim 17, wherein the one or more processors further execute the program instructions to:

receive the request from the workload manager; and send an output to the workload manager.

19. The data processing system of claim 16, wherein the one or more processors further execute the program instructions to:

correlate the monitored data from a plurality of data processing resources processing the workload to provide correlated data;

determine whether the correlated data exceeds a threshold; and identify the occurrence of the event that defines the pattern over the specified time period in response to a determination that the correlated data exceeds the threshold.

20. The data processing system of claim 16, wherein the one or more processors further execute the program instructions to:

correlate the monitored data from a number of a plurality of data processing resources processing the workload to provide correlated data;

determine whether the number of the plurality of data processing resources meets or exceeds a quorum number, wherein the quorum number is less than a total number of the plurality of data processing resources processing the workload; and process the correlated data to identify the occurrence of the event that defines the pattern over the specified time period in response to a determination that the number of the plurality of data processing resources meets or exceeds the quorum number.

21. The data processing system of claim 16, wherein the hybrid cloud is selected from a group of hybrid clouds consisting of:

a first hybrid cloud wherein the provider side processing resources are provided as a service on a public cloud and the consumer side processing resources are provided on a private cloud;

a second hybrid cloud wherein the provider side processing resources are provided as a service on the private cloud and the consumer side processing resources are provided on another private cloud; and a third hybrid cloud wherein the provider side processing resources are provided as the service on a public cloud and the consumer side processing resources are provided on another public cloud.

22. A method for correlating events in data processing resources processing a workload, comprising:

starting, by one or more processors, a provider side monitoring gateway on a provider side data processing system in a first cloud, wherein the provider side monitoring gateway is located on a provider side of a firewall that separates the provider side from a consumer side of a hybrid cloud, and wherein the provider side monitoring gateway collects provider side monitored data from a provider processing monitoring agent associated with provider data processing resources;

starting, by the one or more processors, a consumer side monitoring gateway on a consumer side data processing system in a second cloud, wherein the consumer side monitoring gateway is located on the consumer side of the firewall that separates the provider side from the consumer side of the hybrid cloud, and wherein the consumer side monitoring gateway provides the provider side monitored data from the provider side monitoring gateway to a consumer side monitoring infrastructure within the consumer side data processing system, and wherein the consumer side monitoring gateway collects consumer side monitored data from a consumer processing monitoring agent associated with consumer data processing resources;

establishing, by the one or more processors, a secure connection through the firewall between the provider side monitoring gateway associated with the provider data processing resources and the consumer side monitoring gateway associated with the consumer data processing resources, wherein the secure connection through the firewall enables the consumer side monitoring gateway to pull the provider side monitored data corresponding to the provider processing resources from the provider side monitoring gateway and prevents the provider side monitoring gateway to push data through the firewall into the consumer side monitoring gateway to maintain security of the consumer data processing resources;

pulling, by the one or more processors, the provider side monitored data from the provider side monitoring gateway into the consumer side monitoring gateway using the secure connection;

pushing, by the one or more processors, the provider side monitored data pulled into the consumer side monitoring gateway and the consumer side monitored data to the consumer side monitoring infrastructure;

receiving, by the one or more processors, a request from a workload manager to correlate the events in processing the workload;

responsive to the one or more processors receiving the request, determining, by the one or more processors, whether an event correlation software plug-in is registered with an event correlation service software framework;

responsive to the one or more processors determining that the event correlation software plug-in is not registered with the event correlation service software framework, using, by the one or more processors, an application programming interface of the event correlation service software framework to load and register the event correlation software plug-in;

correlating, by the one or more processors, monitored data from a number of a plurality of data processing resources processing the workload to provide correlated data;

determining, by the one or more processors, whether the number of the plurality of data processing resources meets or exceeds a quorum number, wherein the quorum number is less than a total number of the plurality of data processing resources processing the workload;

responsive to the one or more processors determining that the number of the plurality of data processing resources meets or exceeds the quorum number, processing, by the one or more processors, the correlated data to identify an occurrence of an event that defines a pattern over a specified period of time;

determining, by the one or more processors, whether the correlated data exceeds a threshold;

responsive to the one or more processors determining that the correlated data exceeds the threshold, identifying, by the one or more processors, the occurrence of the event that defines the pattern over the specified period of time;

detecting, by the one or more processors, the occurrence of the event that defines the pattern over the specified time period in the provider side monitored data associated with the provider side processing resources in the first cloud and the consumer side monitored data associated with the consumer side processing resources in the second cloud using the consumer side monitoring infrastructure of the consumer side processing resources;

sending, by the one or more processors, the event as input to an event correlation and aggregation function that aggregates and correlates received events over periods of time;

determining, by the one or more processors, that a series of received events has occurred indicating the consumer side processing resources and the provider side processing resources are in an overload or underutilization condition using the event correlation and aggregation function;

responsive to the one or more processors determining that the series of received events has occurred, generating, by the one or more processors, an event based service request to modify a resource configuration of the hybrid cloud using a service desk ticketing function;

sending, by the one or more processors, the event based service request to the workload manager that accesses the consumer side processing resources and the provider side processing resources to modify the resource configuration of the hybrid cloud to respond to the overload or underutilization condition; and generating, by the one or more processors, a service fulfillment response to the event based service request using the workload manager and sending the service fulfillment response to the service desk ticketing function.

23. The method of claim 22, wherein the request comprises correlation parameters.

* * * * *